(12) United States Patent
Hammond

(10) Patent No.: US 11,389,837 B2
(45) Date of Patent: Jul. 19, 2022

(54) CLEANING ASSEMBLY FOR REUSABLE FILTERS

(71) Applicant: Pure Power, LLC, Reno, NV (US)

(72) Inventor: Alan Boyd Hammond, Incline Village, NV (US)

(73) Assignee: Pure Power LLC, Reno, NV (US)

( * ) Notice: Subject to any disclaimer, the term of this patent is extended or adjusted under 35 U.S.C. 154(b) by 0 days.

(21) Appl. No.: 16/849,905

(22) Filed: Apr. 15, 2020

(65) Prior Publication Data

US 2020/0338604 A1      Oct. 29, 2020

Related U.S. Application Data

(60) Provisional application No. 62/835,320, filed on Apr. 17, 2019.

(51) Int. Cl.
| | | |
|---|---|---|
| *B08B 3/02* | (2006.01) |
| *B01D 35/027* | (2006.01) |
| *B65D 25/32* | (2006.01) |

(52) U.S. Cl.
CPC .............. *B08B 3/02* (2013.01); *B01D 35/027* (2013.01); *B65D 25/32* (2013.01)

(58) Field of Classification Search
None
See application file for complete search history.

(56) References Cited

U.S. PATENT DOCUMENTS

2012/0298145 A1* 11/2012 Rife ...................... B01D 41/04
                                                         134/22.18

* cited by examiner

*Primary Examiner* — Eric W Golightly
*Assistant Examiner* — Arlyn I Rivera-Cordero
(74) *Attorney, Agent, or Firm* — Knobbe Martens Olson & Bear LLP

(57) ABSTRACT

A cleaning assembly for reusable filters comprises a housing and a pressurizing spraying assembly that receives a filter element to be cleaned. The pressurizing spraying assembly can be secured in position relative to the housing using a mount. The mount can pivot about a pivot axis between a storage position and a use position. The pivot axis can be aligned with a handle axis about which a handle is attached to the housing. The housing can collect runoff from a cleaning operation.

6 Claims, 39 Drawing Sheets

CLEANING ASSEMBLY FOR REUSABLE FILTERS

BACKGROUND OF THE INVENTION

Field of the Invention

The present invention generally relates to an apparatus for cleaning reusable filters. More specifically, the present invention relates to a portable assembly that can be used to clean reusable filters.

Description of the Related Art

Reusable oil filters have been used for quite some time in the mobility and transportation industries, for example. These filters are friendly to the environment and can help to reduce toxic waste.

Used oil and used oil filters are a serious concern for the environment. Several states have passed legislation regarding proper disposal of used oil filters. Recycling used oil filters can help, but recycling is expensive, inefficient and inconvenient for most do-it-yourselfers. The average consumer changes oil filters three or four times each year. Over 10 years, that is 30-40 filters per vehicle and there are an estimated 236 million motor vehicles in the United States alone.

SUMMARY OF THE INVENTION

Applicant has discovered that, if reusable filters are to be a serious commercial consideration to address environmental concerns, an apparatus that can clean the filters for reuse will be necessary. Applicants also have discovered that an impediment to wide-scale adoption of reusable filters is a reliable and efficient cleaning system for reusable filters.

Previously, cleaning reusable filters involved a five-gallon bucket, a toothbrush, some coffee filters, dishwashing detergent, paper towels, a mixing container, a garden hose or other source of clean water, and significant manual labor. The detergent would be diluted in water and then the diluted detergent could be poured into the center of the reusable filter to coat the inside of the filter while the outside was lightly scrubbed with the toothbrush. Any runoff would be captured within the bucket. The filter element then would be rinsed by hand with water from the inside out using a garden hose or other similar water supply while the runoff from this step also was captured in the bucket. The filter element then could be air-dried using compressed air from the inside of the filter element to the outside of the filter element. Alternatively, air-drying in sunlight could be used to dry the filter element. This process was time-consuming and manual-labor intensive.

Applicant has developed an apparatus for cleaning reusable filters and a method of cleaning reusable filters. The apparatus addresses the lack of any self-contained reusable filter cleaning apparatus in the marketplace. The method improves upon at least some of the short-comings of the existing cleaning methods.

In some configurations, a cleaning assembly is usable to clean a filter element of a reusable filter. The cleaning assembly comprises a housing. A mount is movably coupled to the housing. A pressurizing spraying assembly is coupled to the mount. The housing comprises a five-gallon bucket. The five-gallon bucket comprises a base. A sidewall extends upward to an upper rim from the base. A lid is removably attachable to the upper rim of the five-gallon bucket. A handle is attached to an upper end of the sidewall. The handle is rotatable about a pivot axis. Pivot pins extend through the sidewall at the pivot axis. The mount is movably coupled to the housing with the pivot pins. A first set of rollers extends inwardly from the upper end of the sidewall and a second set of rollers extends inwardly from the upper end of the sidewall. The first set of rollers is positioned to a first lateral side of the pivot axis by a first distance and the second set of rollers is positioned to a second lateral side of the pivot axis by a second distance. The first distance is greater than the second distance. The mount comprises a first set of cambered slots and a second set of cambered slots. The first set of cambered slots is configured to receive the first set of rollers and the second set of cambered slots is configured to receive the second set of rollers. The first set of cambered slots is formed on a first surface of the mount and the second set of cambered slots is formed on a second surface that is opposite of the first surface of the mount. The first set of cambered slots is laterally outward of the second set of cambered slots.

In some configurations, the cleaning assembly comprises a housing. The housing has a base and at least one sidewall extending upward from the base. A mount is pivotally mounted to the at least one sidewall. A spraying assembly is carried by the mount. The mount is rotatable between a storage position in which the spraying assembly is disposed within the housing at a location below the mount and a use position in which the spraying assembly is disposed generally outside of the housing at a location above the mount.

In some such configurations, the mount snaps into at least one of the storage position and the use position. In some such configurations, the mount snaps into both of the storage position and the use position.

In some such configurations, a gap is defined between a lateral side of the mount and the sidewall of the housing.

In some such configurations, the mount pivots about a pivot axis and a gap is defined between each side edge of the mount and the sidewall such that the pivot axis does not intersect either of the gaps.

Is some configurations, a cleaning assembly is usable to clean a filter element of a reusable filter. The cleaning assembly comprises a housing. A mount is movably connected to the housing. A pressurizing spraying assembly is connected to the mount. The mount comprises a central opening. The pressurizing spraying assembly comprises a mixing chamber body. The mixing chamber body comprises an air inlet and a water inlet at a first end. The mixing chamber body comprises a sidewall that defines a lumen. A spraying outlet extends through the sidewall such that a flow of air and water from the air inlet and the water inlet can pass from the lumen through the spraying outlet. The spraying outlet defines a linear spray pattern. The mixing chamber body comprises an outer dimension that can be received within the filter element such that the filter element can be rotated along an axis of the filter element relative to the linear spray pattern. The linear spray pattern extends in an axial direction of the filter element. The linear spray pattern is directed downward into the housing through the central opening of the mount.

In some configurations, a cleaning assembly is usable to clean a filter element of a reusable filter. The cleaning assembly comprises a housing and a pressurizing spraying assembly. The pressurizing spraying assembly comprises a body that supports the filter element during a cleaning operation. The body includes an elongate spraying outlet.

The elongate spraying outlet directs a spray of pressurized water into the housing and the filter element is movable relative to the spray.

In some such configurations, the elongate spraying outlet is generally linear. In some such configurations, the generally linear elongate spraying outlet extends in an axial direction of the body of the spraying assembly. In some such configurations, the generally linear elongate spraying outlet is defined by a slot in the body of the spraying assembly.

In some configurations, a method is provided for cleaning a filter element of a reusable filter. The method comprises removing the filter element from the reusable filter. The method comprises mounting the filter element onto a portion of a pressurizing spraying assembly. The method comprises connecting an air supply and a water supply to the pressurizing spraying assembly. The method comprises supplying pressurized air and water to the pressurizing spraying assembly. The method comprises causing relative movement between the filter element and a spray of pressurized air and water that is emitted from the pressurizing spraying assembly to effect cleaning of the filter element.

In some such configurations, relative movement is caused by rotating the filter element about the portion of the pressurizing spraying assembly upon which the filter element is mounted. In some such configurations, the portion of the pressurizing spraying assembly comprises a generally linear spray outlet that is directed downwardly and the method further comprises mounting a sleeve element over at least a portion of the generally linear spray outlet that extends axially beyond the filter element.

In some such configurations, mounting the filter element comprises sliding the filter element along the portion of the pressurizing spraying assembly and rotating a retaining clip. In some such configurations, the method comprises mounting a sleeve element adjacent to the filter element prior to rotating the retaining clip.

BRIEF DESCRIPTION OF THE DRAWINGS

These and other features, aspects and advantages of illustrated embody of the present invention now will be described with reference to the drawings of a preferred embodiment, which embodiment is intended to illustrate and not to limit the invention, and in which figures.

DETAILED DESCRIPTION OF THE PREFERRED EMBODIMENT

Figure 1:
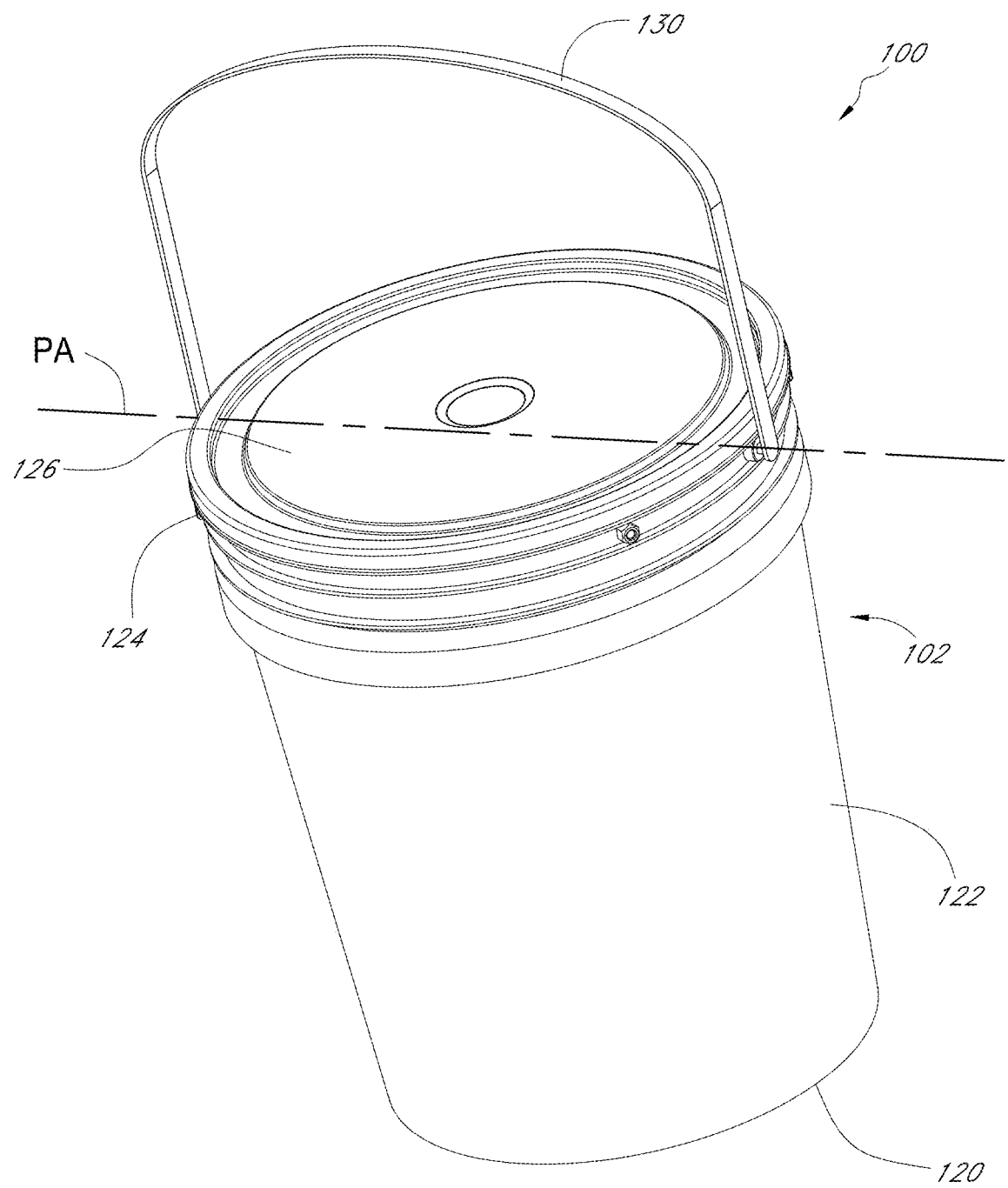
FIG. 1 is a top perspective view of a cleaning assembly arranged and configured in accordance with certain features, aspects, and advantages of the present invention, the cleaning assembly being shown in a shipping and/or storage configuration.
Figure 29:
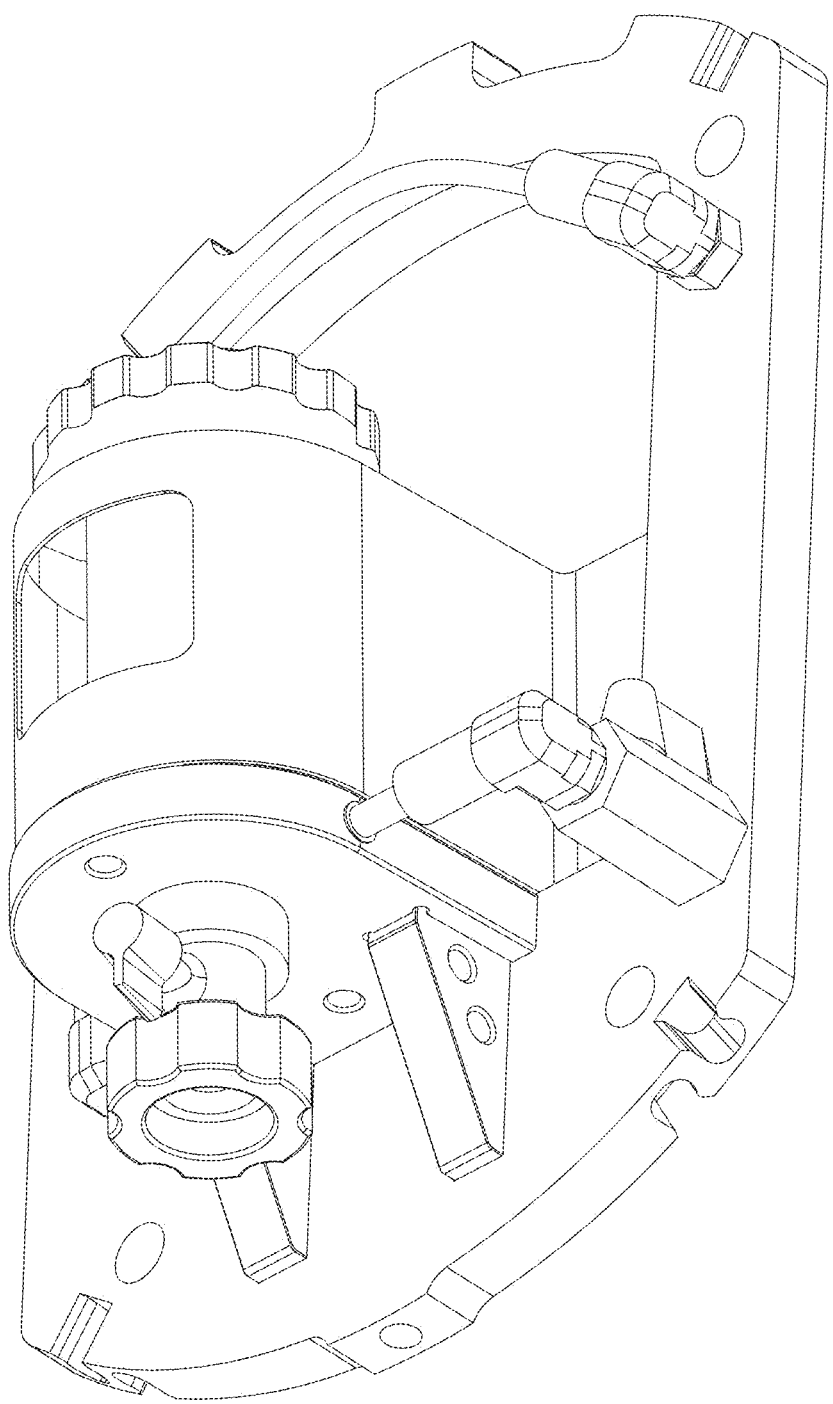
FIG. 29 is a top perspective view of the mount and pressurizing spraying assembly of the embodiment of FIG. 28.
Figure 30:
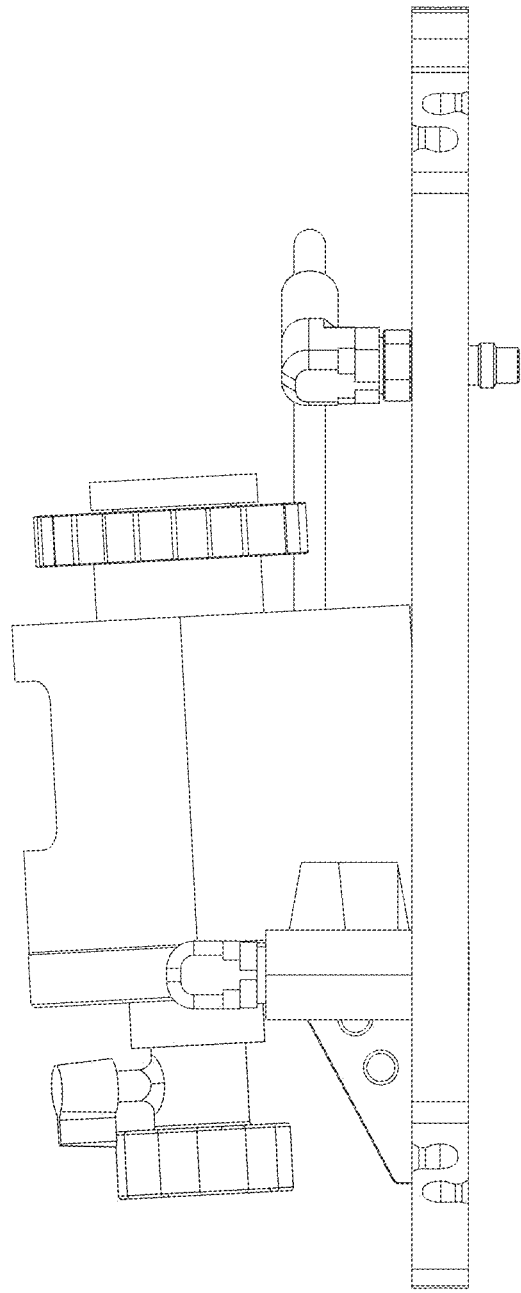
FIG. 30 is a left side view of the mount and pressurizing spraying assembly of FIG. 29.
Figure 31:
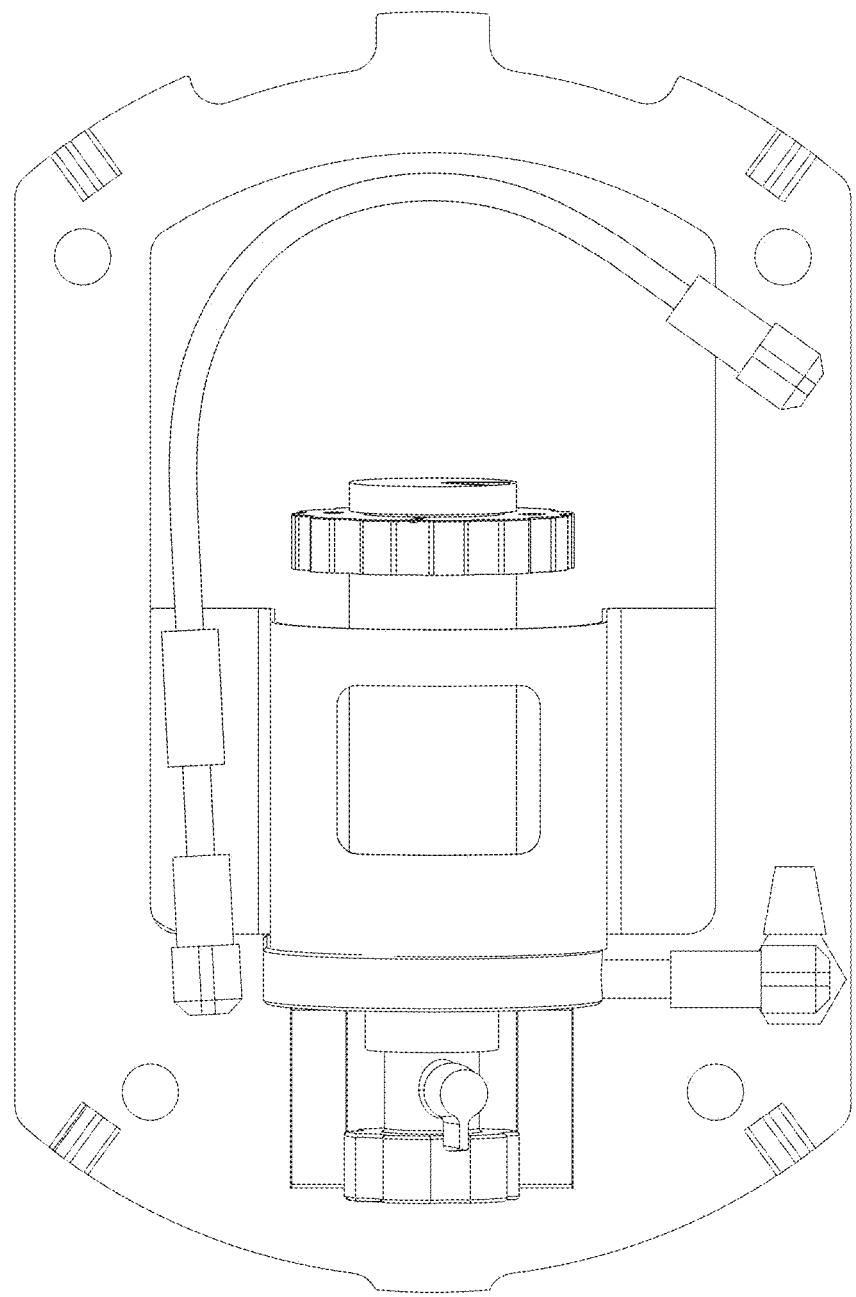
FIG. 31 is a top plan view of the mount and pressurizing spraying assembly of FIG. 29.
Figure 32:
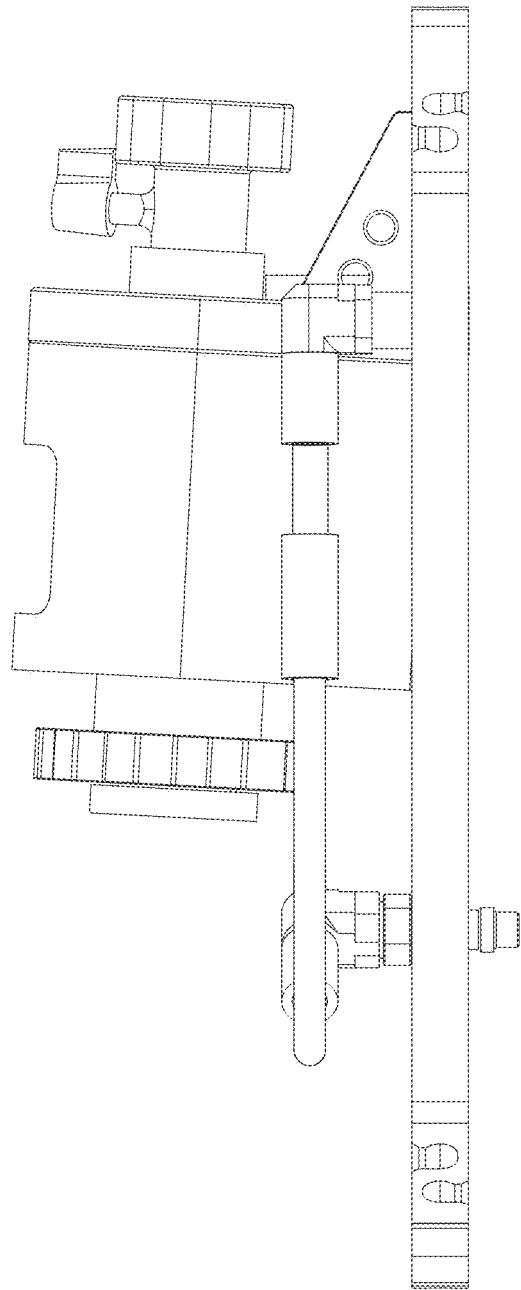
FIG. 32 is a right side view of the mount and pressurizing spraying assembly of FIG. 29.
Figure 33:
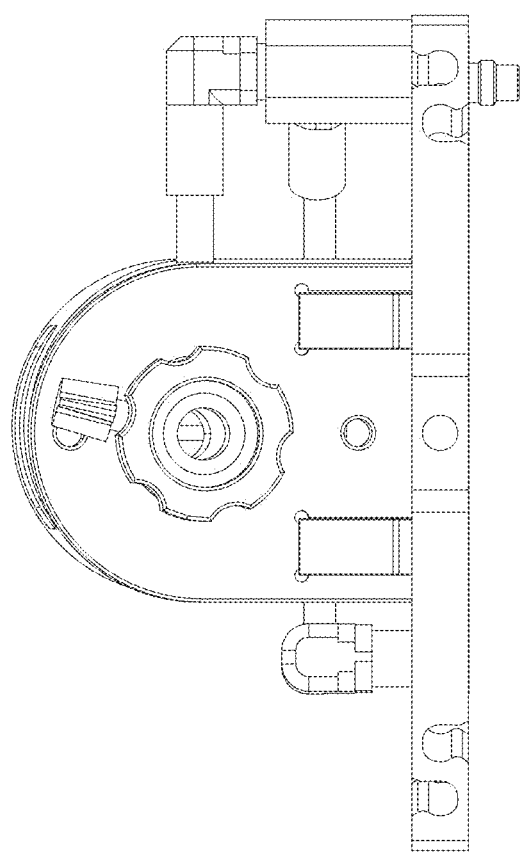
FIG. 33 is a rear view of the mount and pressurizing spraying assembly of FIG. 29.

FIG. 1 illustrates an embodiment of a cleaning assembly 100 that is arranged and configured in accordance with certain features, aspects, and advantages of the present invention. The illustrated cleaning assembly 100 generally comprises three main components: a housing 102, a mount 104, and a pressurizing spraying assembly 106. FIG. 29 illustrates another embodiment of a cleaning assembly 400 that is arranged and configured in accordance with certain features, aspects, and advantages of the present invention. The cleaning assembly 400 also generally comprises a housing 402, a mount 404, and a pressurizing spraying assembly 406. The two illustrated embodiments of the cleaning assembly have many components in common and certain variations will be referred to throughout the following description. With respect to the differences between the embodiments, the components of one embodiment are easily integrated into the other embodiment and not all of the differences between the two embodiments need to be used in any particular embodiment such that other cleaning assembly embodiments may incorporate only one or more than one of the variations.

Figure 4:
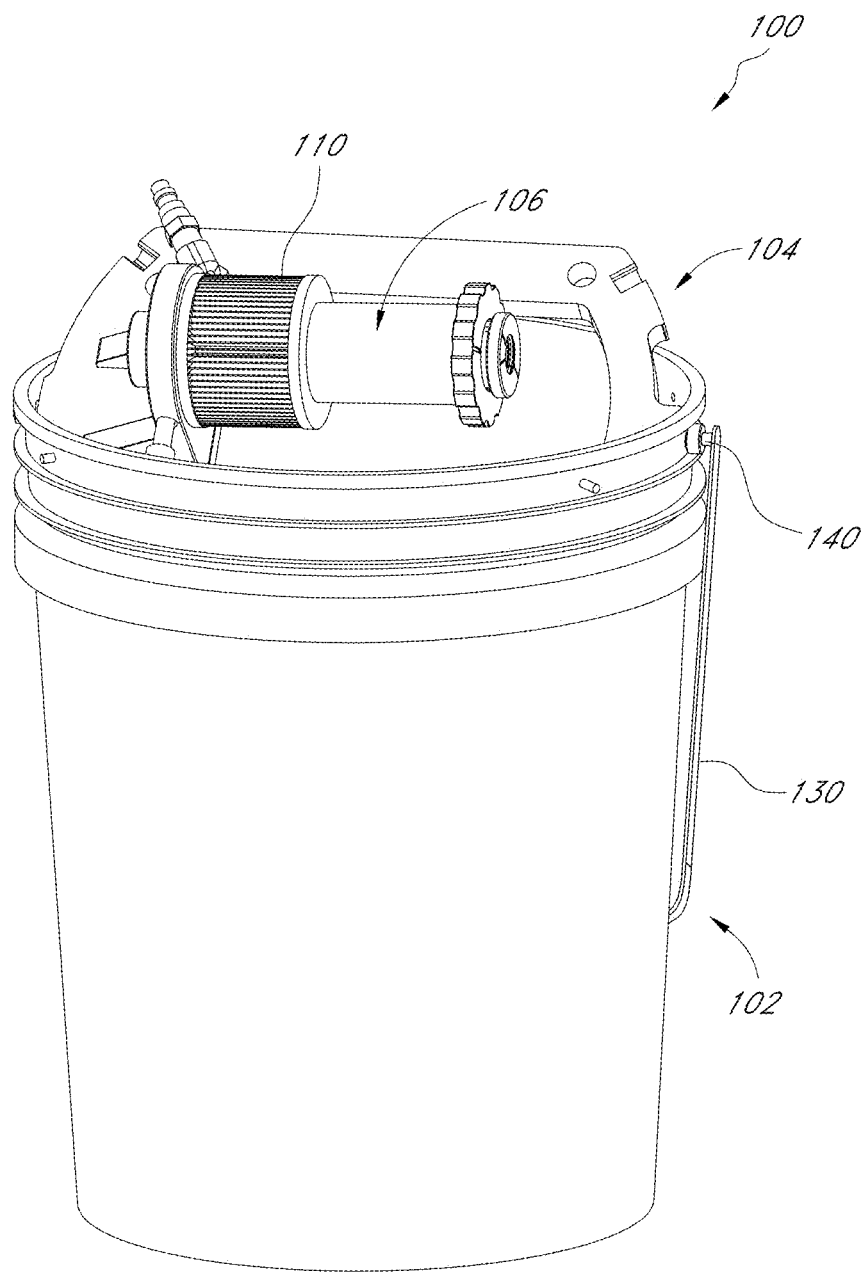
FIG. 4 is a top perspective view of the cleaning assembly of FIG. 1 with the lid fully removed and a mount and pressurizing spraying assembly pivoted partway to a use position from a storage position.
Figure 5:
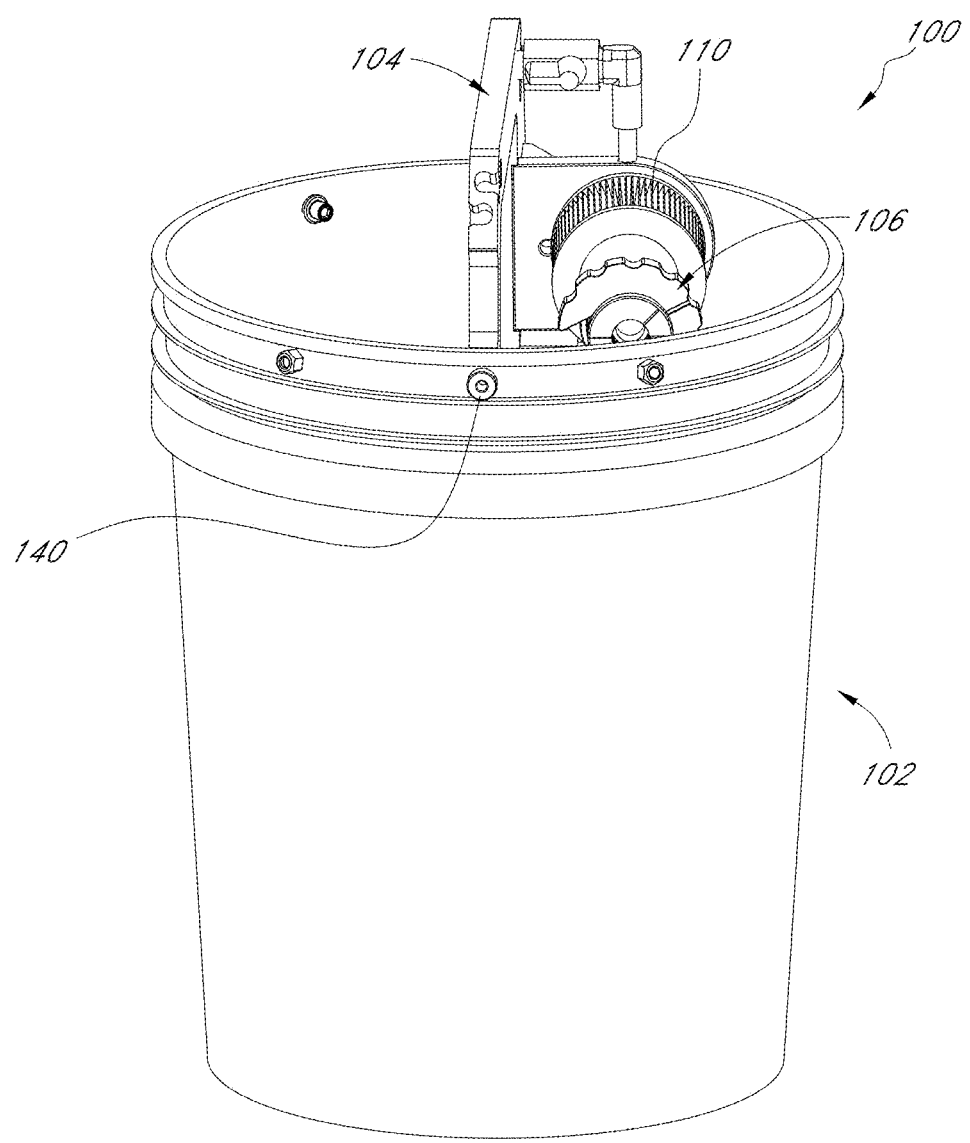
FIG. 5 is a top perspective view of the cleaning assembly of FIG. 1 with a handle removed and the mount and pressurizing spraying assembly pivoted halfway to the use position from the storage position.
Figure 6:
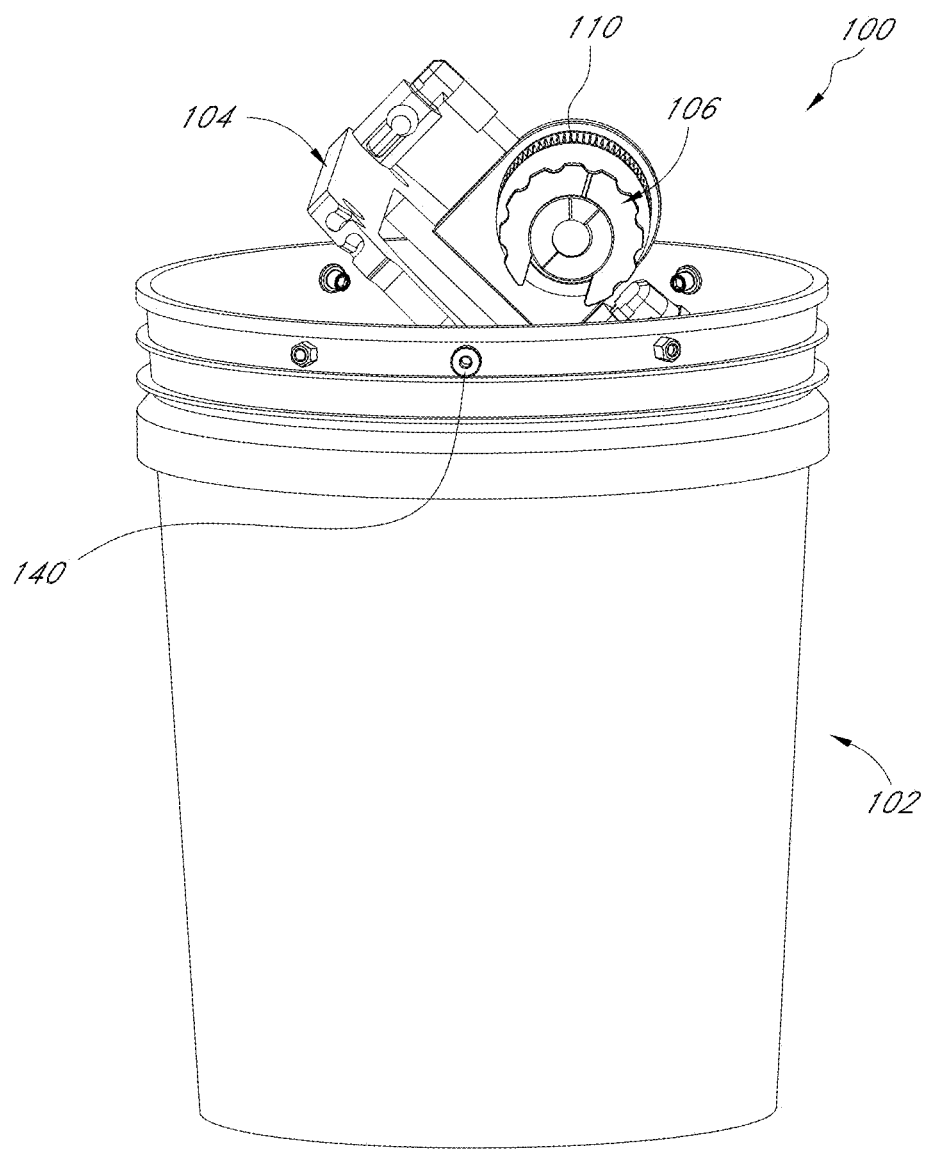
FIG. 6 is a top perspective view of the cleaning assembly of FIG. 1 with the handle removed and the mount and pressurizing spraying assembly pivoted almost completely to the use position from the storage position.
Figure 18:
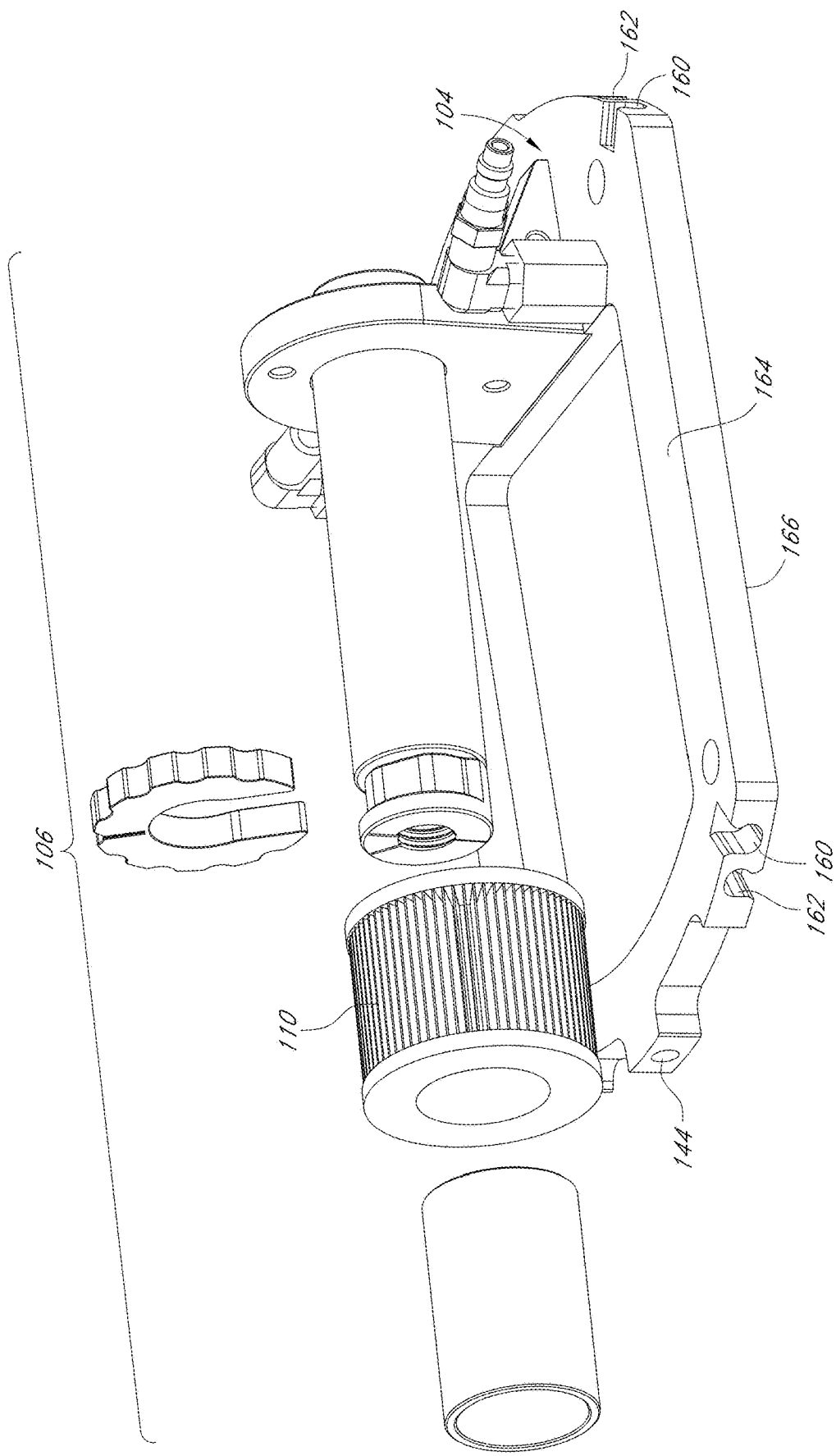
FIG. 18 is an exploded view of the mount and the pressurizing spraying assembly with the water valve removed.

With reference initially to FIG. 4, the illustrated housing 102 supports the mount 104. The illustrated mount 104 supports the pressurizing spraying assembly 106. The pressurizing spraying assembly 106 receives one or more filter element 110 (best shown in FIG. 18) from one or more reusable filter during a cleaning operation.

Each filter element 110 typically has a generally cylindrical opening through which a portion of the pressurizing spraying assembly 106 extends and that portion of the pressurizing spraying assembly 106 emits one or more pressurized water streams that impinge upon the cylindrical opening of the filter element 110 to clean the filter element 110 of sediment and residue. The housing 102 captures and holds the water, sediment, and residue. After the cleaning operation is complete, the water, sediment, and residue can be safely disposed of from the cleaning assembly 100 in an environmentally-friendly manner. Finally, the pressurizing spraying assembly 106 and the mount 104 can be positioned for safe storage within the housing 102.

Advantageously, as will be described, the mount 104 couples the pressurizing spraying assembly 106 to the housing 102 during use of the cleaning assembly 100. In some configurations, the pressurizing spraying assembly 106 can be moved relative to the housing 102 between a use position (e.g., FIG. 7) and a stored position (e.g., FIG. 3). In some such configurations, the pressurizing assembly 106 can be secured in either or both of the use and storage positions. In some such configurations, the mount 104 can be moved relative to the housing 102 between a position that corresponds to the pressurizing spraying assembly 106 being used and a position that corresponds to the pressurizing spraying assembly 106 being stored. In some such configurations, the mount 104 snaps into one or more of the use position and the stored position. When the mount 104 snaps into one or more of the use position and the storage position, there can be one or more of an audible indicator, a tactile indicator, a haptic indicator, and a visual indicator.

The housing 102 can have any suitable configuration. The housing 102 can be configured to capture runoff from the cleaning process. In some configurations, the housing 102 can be configured to minimize splashing or overspray. In some configurations, the mount 104 in combination with the housing 102 can be configured to minimize splashing or overspray. In some configurations, the housing 102 can be configured to store the mount 104 and the pressurizing spraying assembly 106 during periods of non-use. In some configurations, the housing 102 can be configured to act as a shipping container.

With reference to FIG. 1, the illustrated housing comprises a base 120. At least one sidewall 122 extends upwardly from the base 120. While the illustrated container 102 comprises a single cylindrical sidewall 122, other configurations may include more than a single sidewall. With respect to the term "cylindrical," in some configurations, the sidewall 122 slightly varies from absolutely cylindrical such that one housing 122 can be nested inside of a second housing prior to assembly with the mount 104. As such, cylindrical should be understood to have the ordinary meaning as well as a broader meaning that encompasses a tapering cylinder that facilitates nesting. An upper end 124 of the sidewall 122 can be configured to receive a removable lid 126.

In some configurations, the lid 126 and the sidewall 124 can be connected with a fluid-tight seal. The lid 126 can be removed during a cleaning operation but can be installed on the upper end 124 of the sidewall 122 for storage and for shipping. The fluid tight seal can be formed through interlocking surfaces or in any other suitable manner.

A handle 130 also can be connected to the upper end 124 of the sidewall 122. The handle 130 can be pivotally attached to the sidewall 124. In the illustrated configuration, the handle 130 pivots about a pivot axis PA. The handle 130 facilitates transport of the housing 102 as well as dumping of remnants from a cleaning operation collected inside of the housing 102.

The illustrated housing 102 comprises a 5 gallon bucket. Using the bucket as the housing 102 simplifies manufacturing of the cleaning assembly 100. In addition, using the bucket as the housing 102 provides a ready configuration for shipping and for storage when the bucket is provided with the lid 126. Further, the internal volume of the bucket ensures that any de minimis amount of oil trapped within the filter element 110 during cleaning will be suitably diluted prior to disposal. In some cases, up to 0.07 ounces of oil can be discarded with one gallon of water but users will need to pay attention to local regulations when determining how to dispose of any contaminated oil or water resulting from a cleaning operation.

Figure 2:
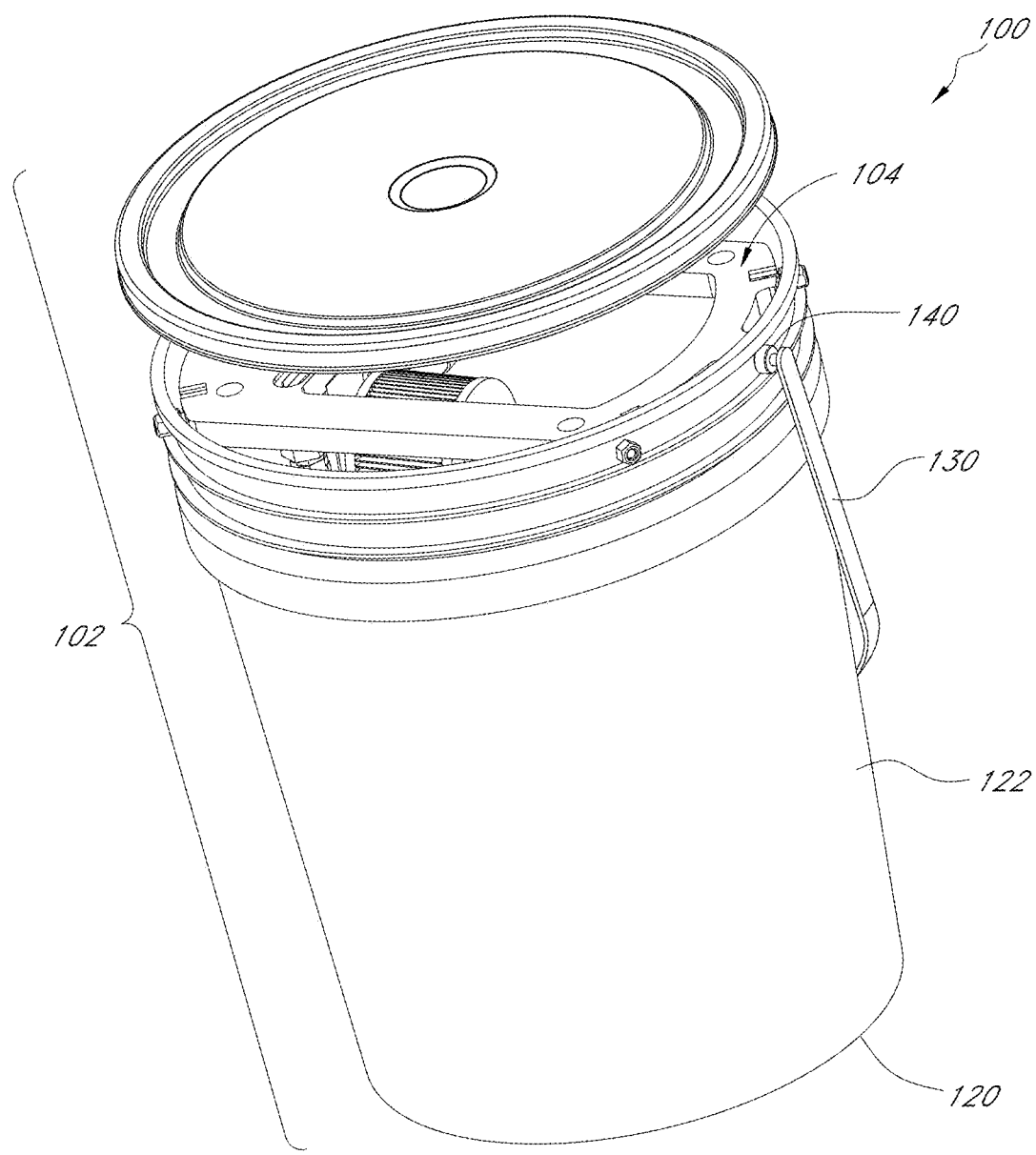
FIG. 2 is a top perspective view of the cleaning assembly of FIG. 1 with a lid in the process of being removed for use.
Figure 16:
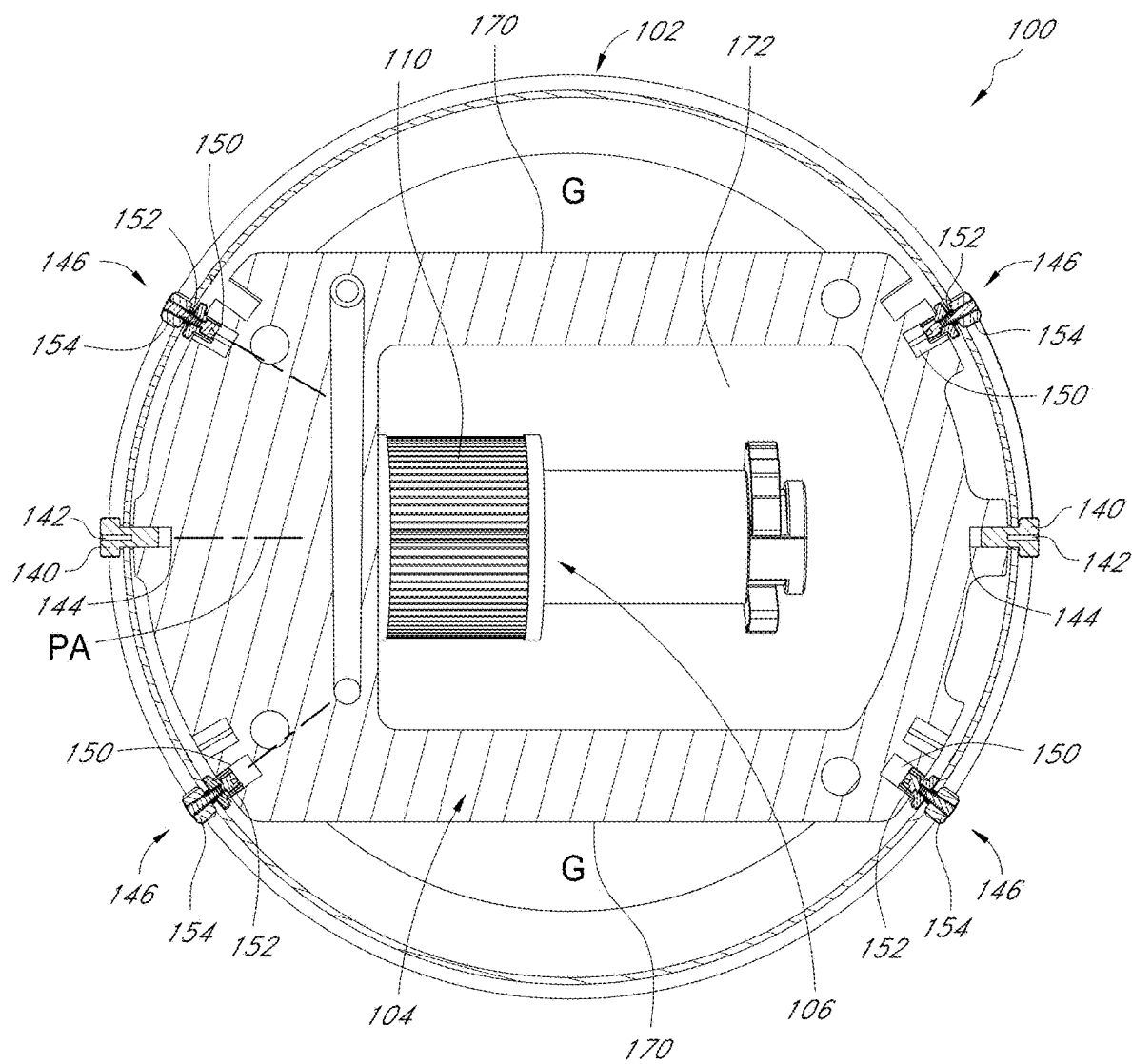
FIG. 16 is a top cross-sectional view showing a positional securement assembly.

As discussed above, the mount 104 is supported by the housing 102. With reference to FIG. 2, two pivot pins 140 (one shown) secure the mount 140 to the housing 102. Both of the pivot pins 140 can be seen in FIG. 17. As shown in FIG. 16, the pivot pins 140 each define a recess 142. The recess 142 is sized and configured to receive an end of the handle 130. Other suitable configurations, including positioning the ends of the handle 130 vertically above or below the pivot pins 140 also can be used. The illustrated configuration aligns the pivot axis PA with a handle axis such that the cleaning assembly 100 is better balanced. In some configurations, the pivot pins 140 can extend through a portion of the handle 130 and can be used to secure the handle 130 to the housing 102.

The mount 104 can be provided with a bore 144 corresponding to each of the pivot pins 140. The pivot pins 140 can be secured against rotation relative to one or both of the sidewall 122 or the bore 144 in any suitable manner keeping in mind the desire to allow the mount 104 to pivot relative to the housing 102. In the illustrated configuration, the pivot pins 140 are glued into the respective bores 144. In some configurations, the bores 144 can be internally threaded and the pivot pins 140 can be threaded into the bores 144. In some configurations, bosses or pegs can protrude outward from the mount 104 and the bosses or pegs can extend through openings formed in the sidewall 122. Other mounting variations also can be used keeping in mind a desire to connect the mount 104 to the housing 102 and to allow the mount 104 to move between a stored position and a use position.

With reference again to FIG. 16, the sidewall 122 also receives at least one pin assembly 146. In the illustrated configuration, four pin assemblies 146 are used. Any suitable pin or pin assembly can be used. Each illustrated pin assembly 146 comprises a roller 150 that is secured to the sidewall 122 using a screw 152 and a nut 154. The screw 152 has a head that is embedded within the roller 150 and a shaft that extends through the sidewall 122 into the nut 154. The roller 150 can have any suitable configuration. The illustrated roller 150 is a Delrin roller.

The illustrated cleaning assembly 100 has the pin assemblies 146 on one side of the pivot axis PA spaced further from the pivot axis PA that the pin assemblies 146 on the other side of the pivot axis PA. In the orientation of FIG. 16, the pin assemblies 146 above the pivot axis PA are spaced further from the pivot axis PA than the pin assemblies 146 below the pivot axis PA. Each of the slots of each of the sets 160, 162 forms a recess in a surface of the mount 104.

Figure 17:
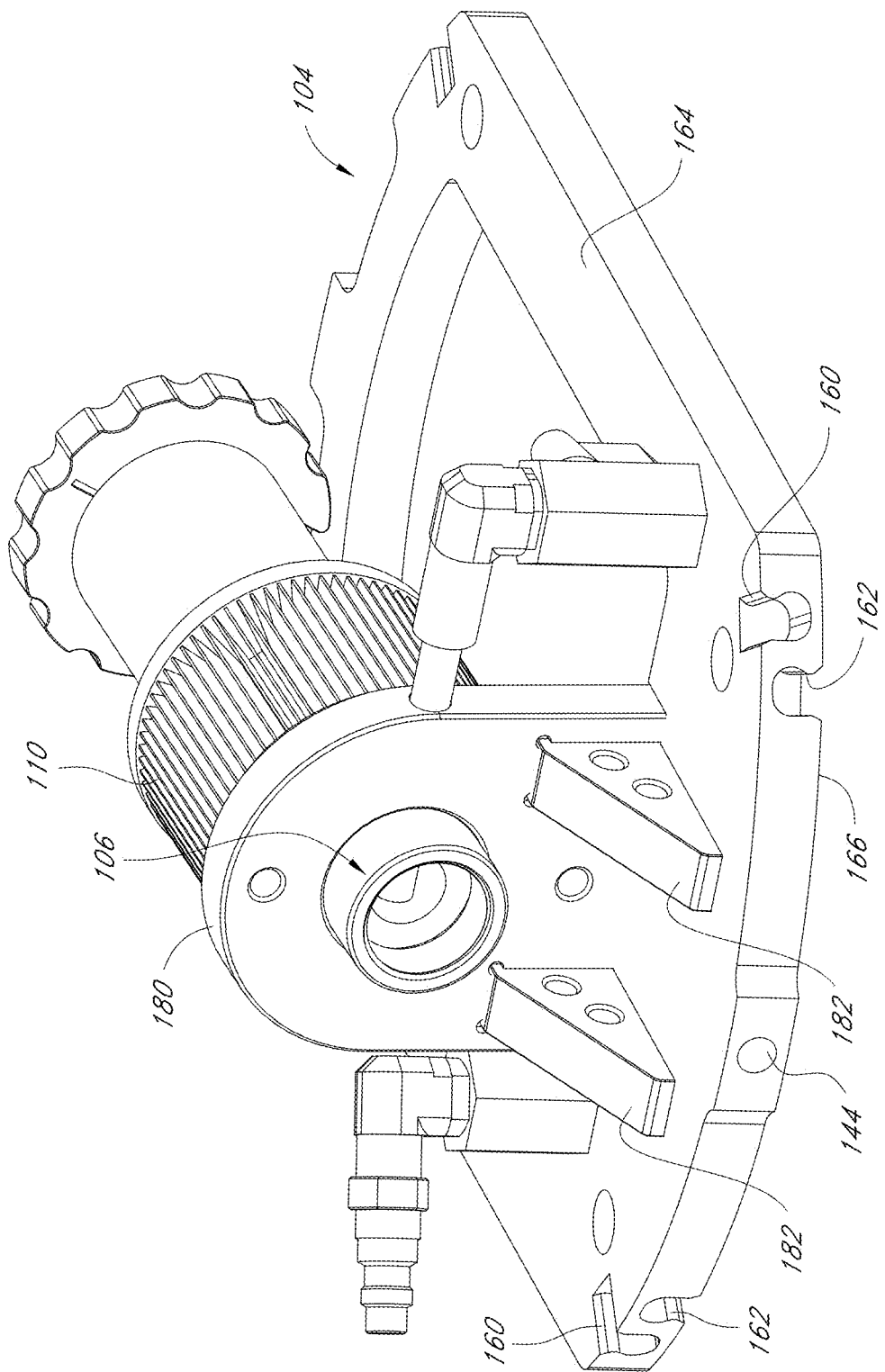
FIG. 17 is a top perspective view of the mount and the pressurizing spraying assembly with the water valve removed.

With reference now to FIG. 17, each end of the mount 104 comprises a first set of cambered slots 160 and a second set of cambered slots 162. Each of the sets 160, 162 is bisected by the pivot axis PA. The first set of the cambered slots 160 is outward of the second set of the cambered slots 162. The first set of the cambered slots 160 forms recesses in an upper surface 164 (in the use position) while the second set of the cambered slots 162 forms recesses in a lower surface 166 (in the use position).

Each of the slots also has a camming surface (e.g., projection) formed along at least one side such that the roller 150 can click into position. The roller 150 and the corresponding slot can provide at least one of audible indicator, a tactile indicator, a haptic indicator, and a visual indicator that the mount 104 has been fully rotated to the desired position (e.g., use or stored). In the illustrated configuration, the camming surface is on the outermost edge of the slot relative to the pivot axis PA. Other configurations also can be used to form a positive lock in one or more position.

In the illustrated configuration, only one slot of the first set of cambered slots 160 at each end of the mount 104 will be occupied by a roller and only one slot of the second set of cambered slots 162 at each end of the mount 104 will be occupied by a roller in either the use or stored position of the mount 104. Further, of each paired slots to the same side of the pivot axis PA, only one slot of each of those pairs of slots will be occupied by a roller in either the use or stored position of the mount 104.

Figure 3:
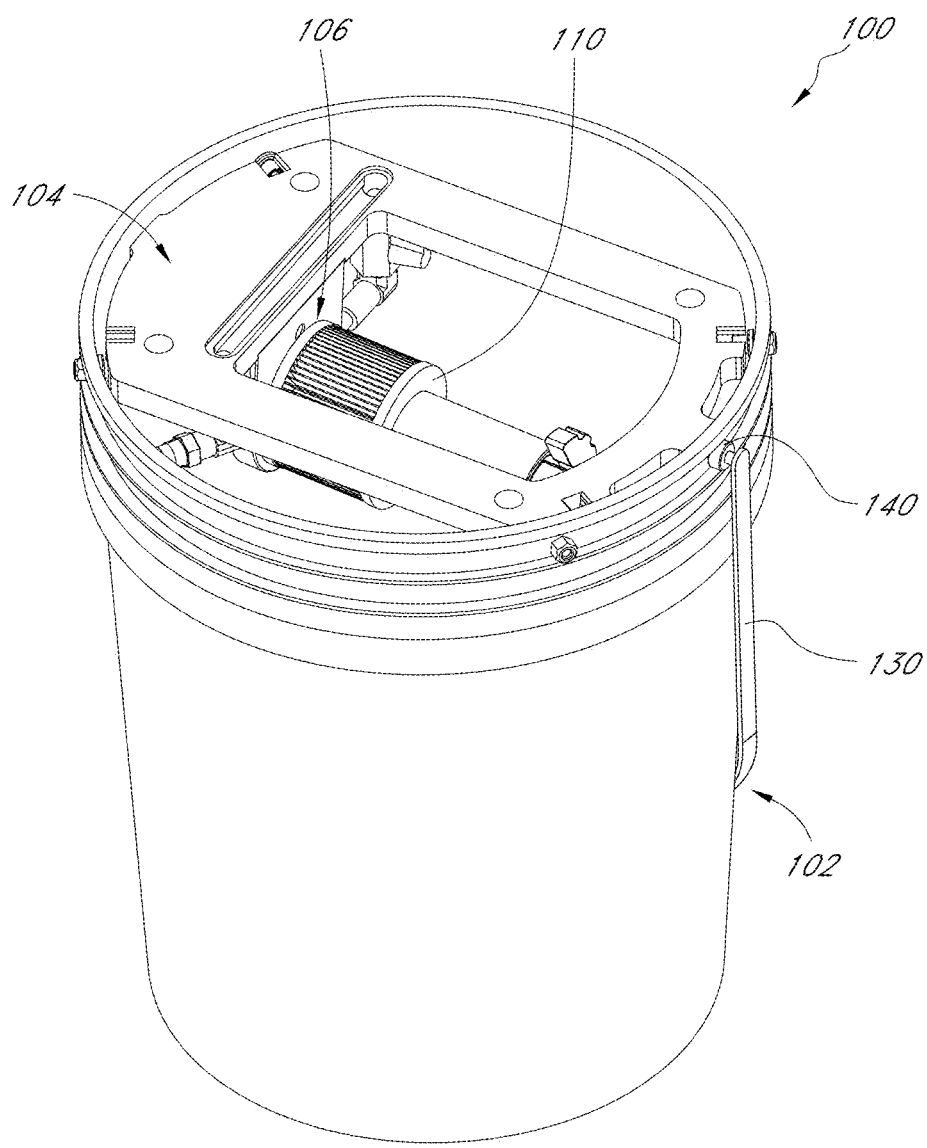
FIG. 3 is a top perspective view of the cleaning assembly of FIG. 1 with the lid fully removed.
Figure 7:
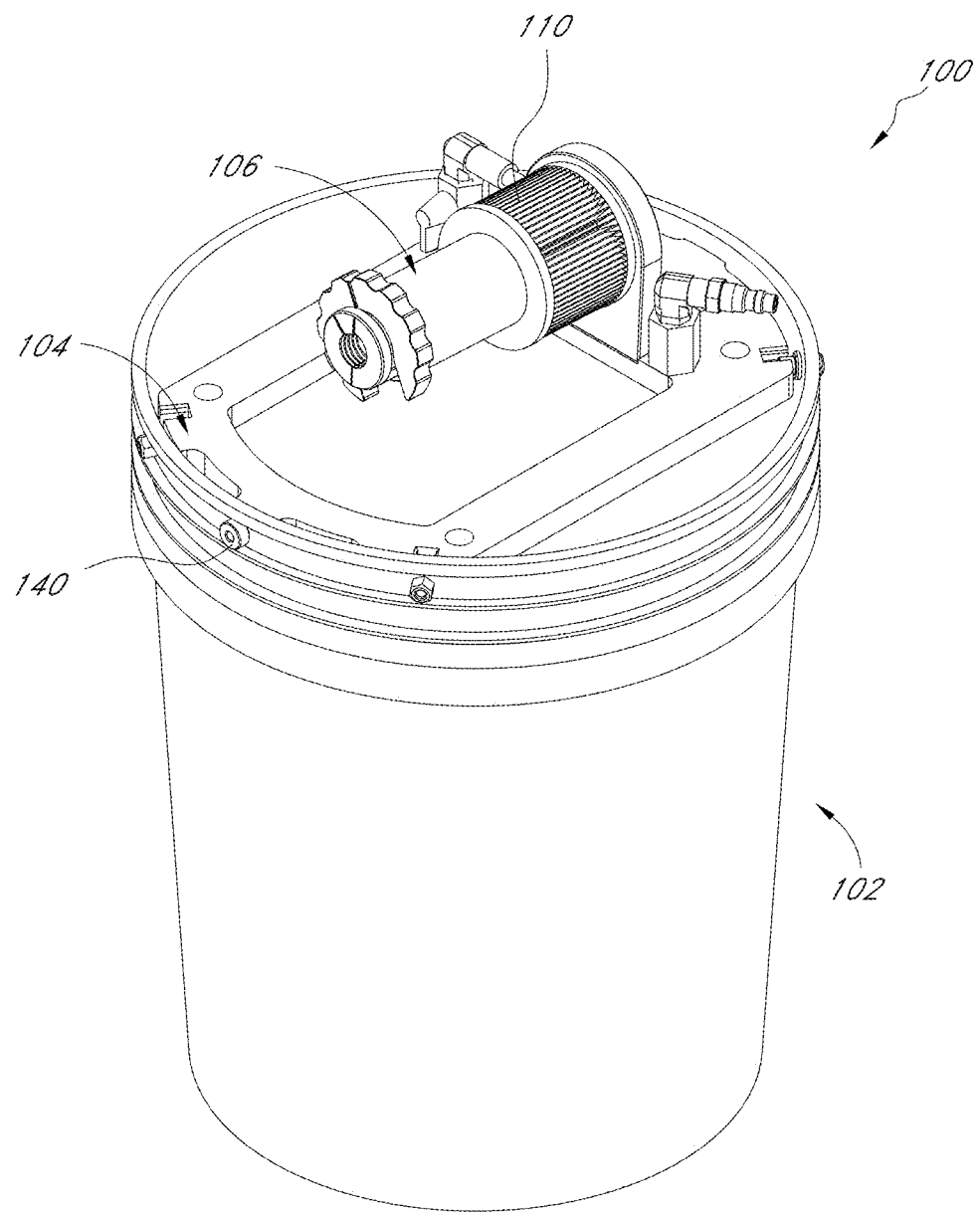
FIG. 7 is a top perspective view of the cleaning assembly of FIG. 1 with the handle removed and the mount and pressurizing spraying assembly pivoted to the use position.

The illustrated cleaning assembly 100 features a positive lock in each of the storage and the use positions. In some configurations, a positive lock may only be provided in the use position. FIG. 3 illustrates the cleaning assembly 100 with the mount 104 locked in the storage position. FIG. 7 illustrates the cleaning assembly 100 with the mount 104 locked in the use position.

With reference to FIG. 16, when the mount 104 is secured to the housing 102, two lateral sides 170 define gaps G with an inner surface of the sidewall 122. The gaps G facilitate emptying of the housing 102 following a cleaning cycle. In the illustrated configuration, the gaps G are defined by a curved surface and a straight surface. The gaps G can have a largest span of 0.25 inch or larger. The pivot axis PA extends between the two gaps G. The illustrated pivot axis PA does not intersect either of the gaps G. In some configurations, the pivot axis PA is positioned in between the gaps G and does not intersect either or both of the gaps G. Thus, the housing 102 can be tipped about the pivot axis PA while the handle 130 is being held such that the contents of the housing 102 can be dumped through at least one of the gaps G. While each of the illustrated gaps G is at least partially defined by the linear lateral side 170, the lateral side 170 need not be linear and can have any suitable configuration.

In addition, the mount 104 further comprises a central opening 172. The illustrated central opening 172 is surrounded by structure of the mount 104. The central opening 172 allows for fluids used during the cleaning operation to drain into a cavity defined by the housing 102. In some configurations, the fluids drain through the opening 172 to the bottom of the housing 102. Providing an oversized central opening 172 also reduces the mass of the cleaning assembly 100.

Figure 8:
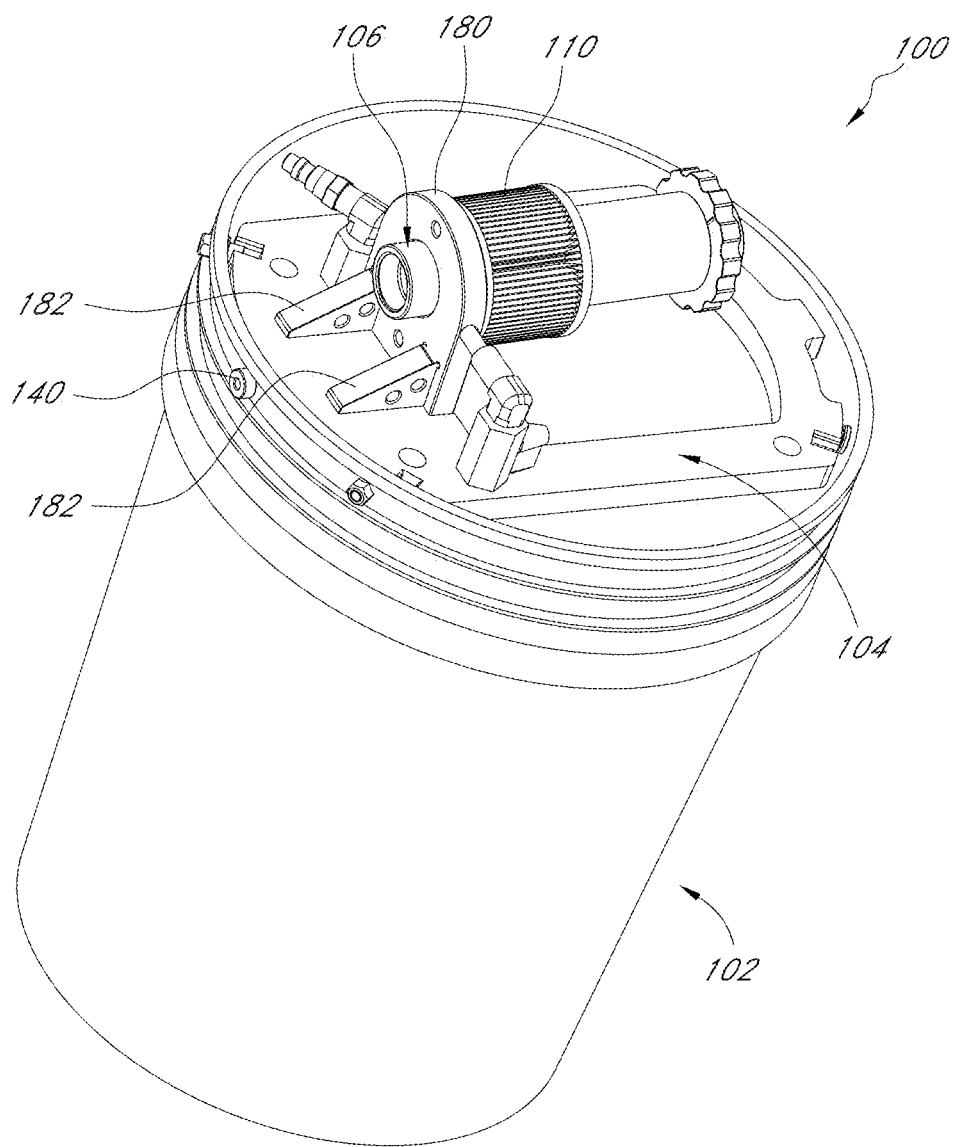
FIG. 8 is a top perspective view of the cleaning assembly of FIG. 1 with the handle removed, a water valve removed, and the mount and pressurizing spraying assembly pivoted to the use position.
Figure 9:
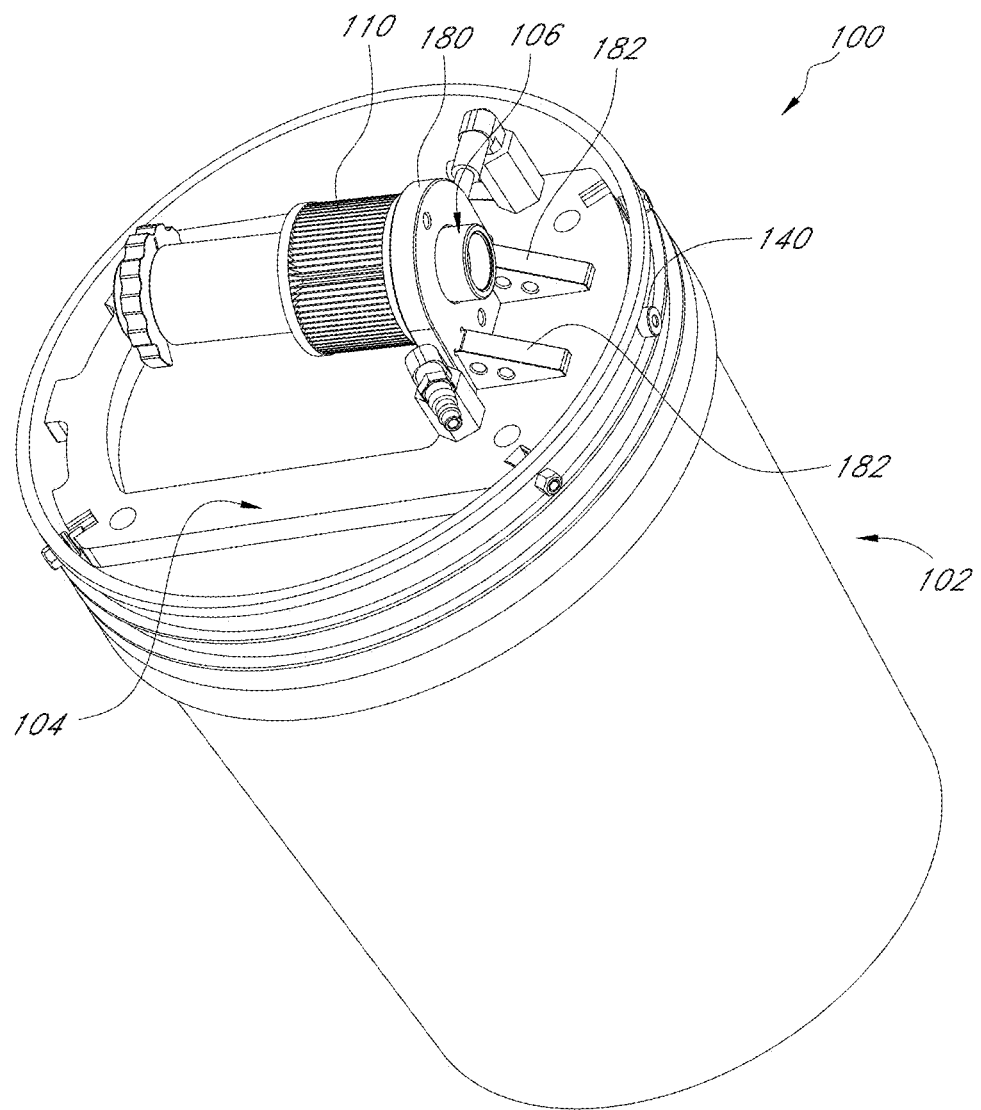
FIG. 9 is a top perspective view of the cleaning assembly of FIG. 1 with the handle removed, a water valve removed, and the mount and pressurizing spraying assembly pivoted to the use position.
Figure 10:
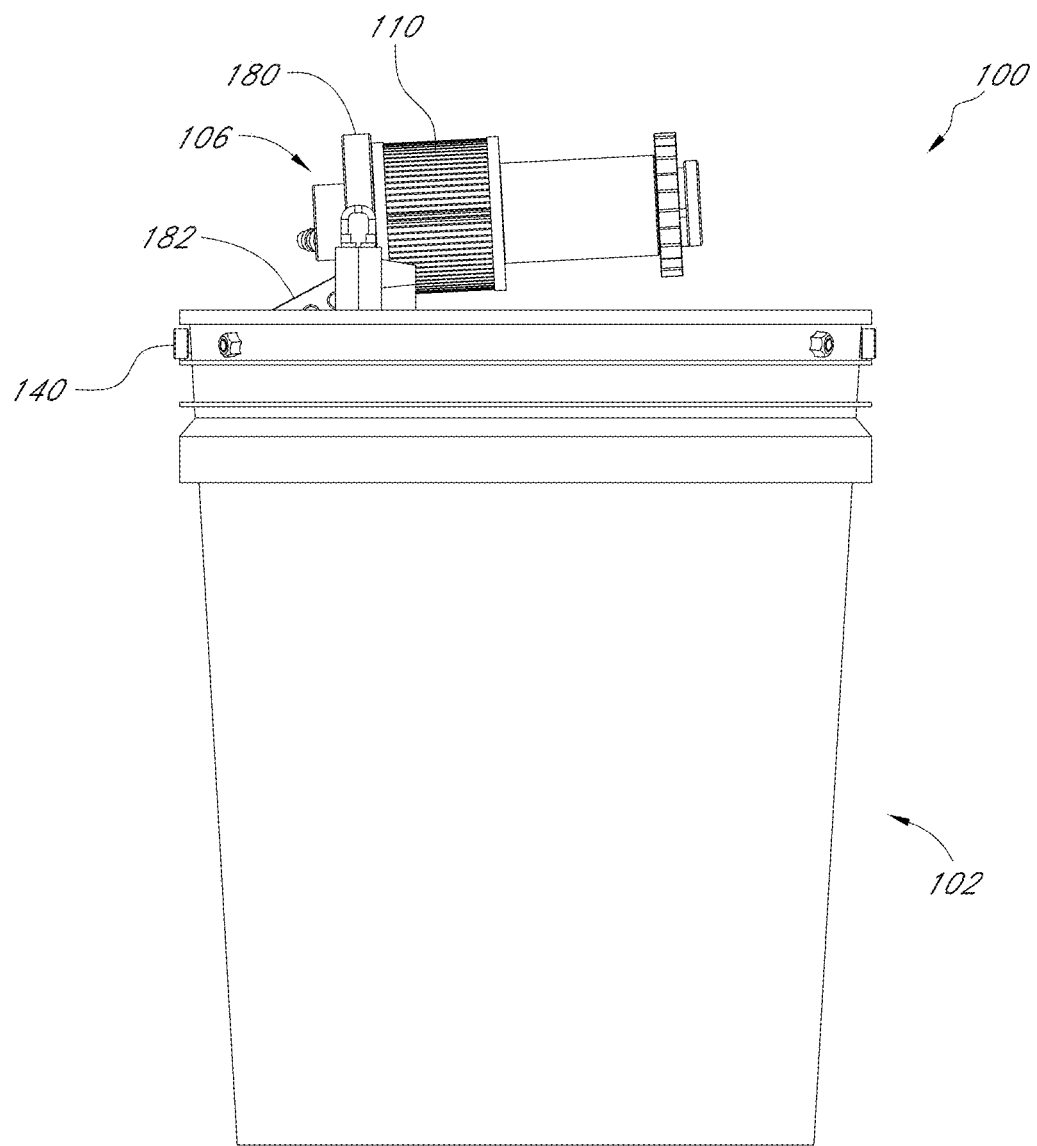
FIG. 10 is a side elevation front side view of the cleaning assembly as shown in FIG. 9.
Figure 11:
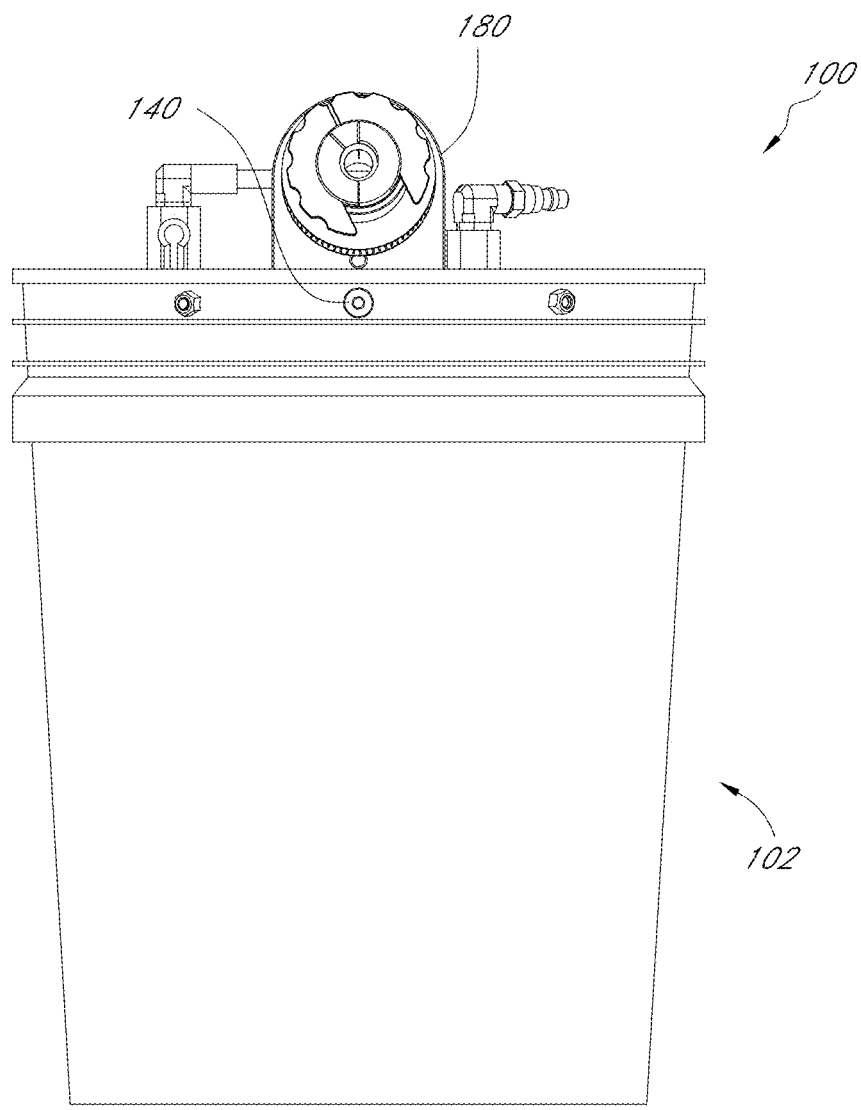
FIG. 11 is a side elevation right side view of the cleaning assembly as shown in FIG. 9.
Figure 12:
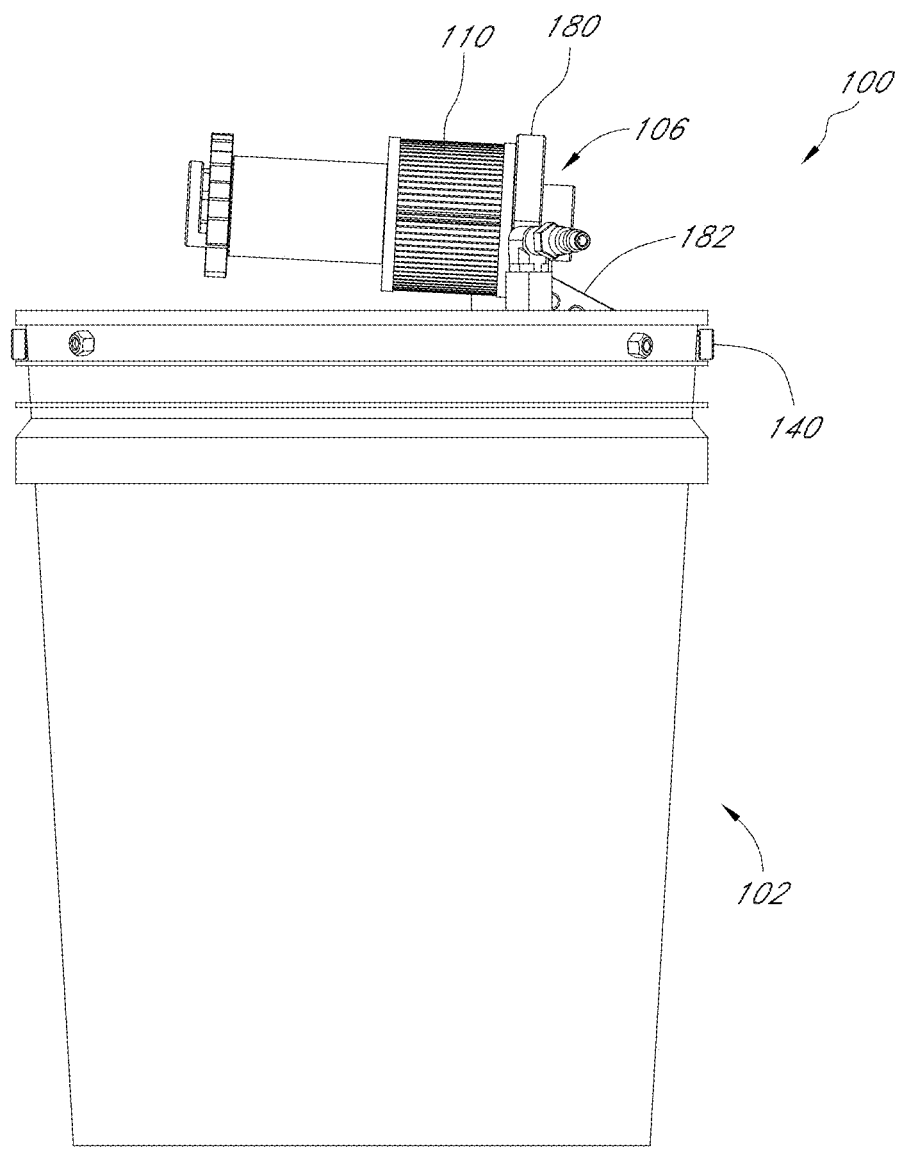
FIG. 12 is a side elevation rear view of the cleaning assembly as shown in FIG. 9.
Figure 13:
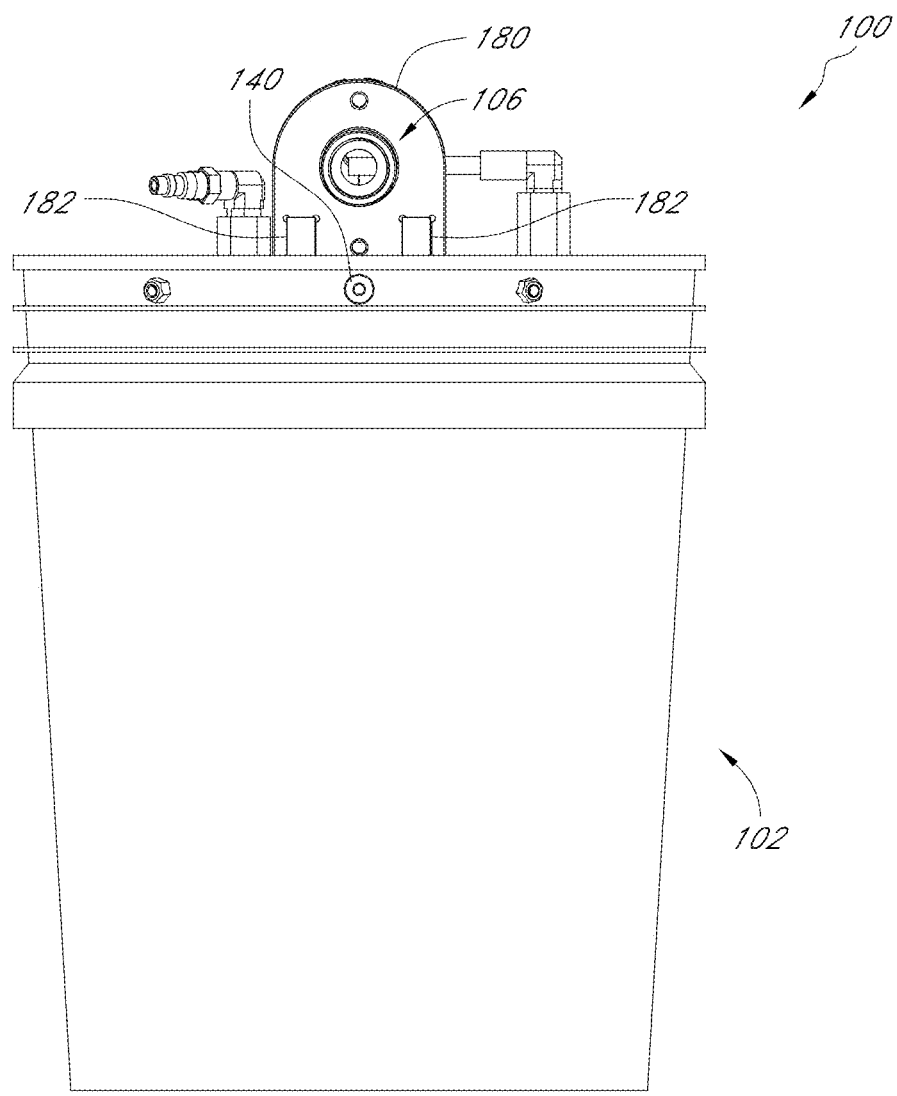
FIG. 13 is a side elevation left view of the cleaning assembly as shown in FIG. 9.
Figure 14:
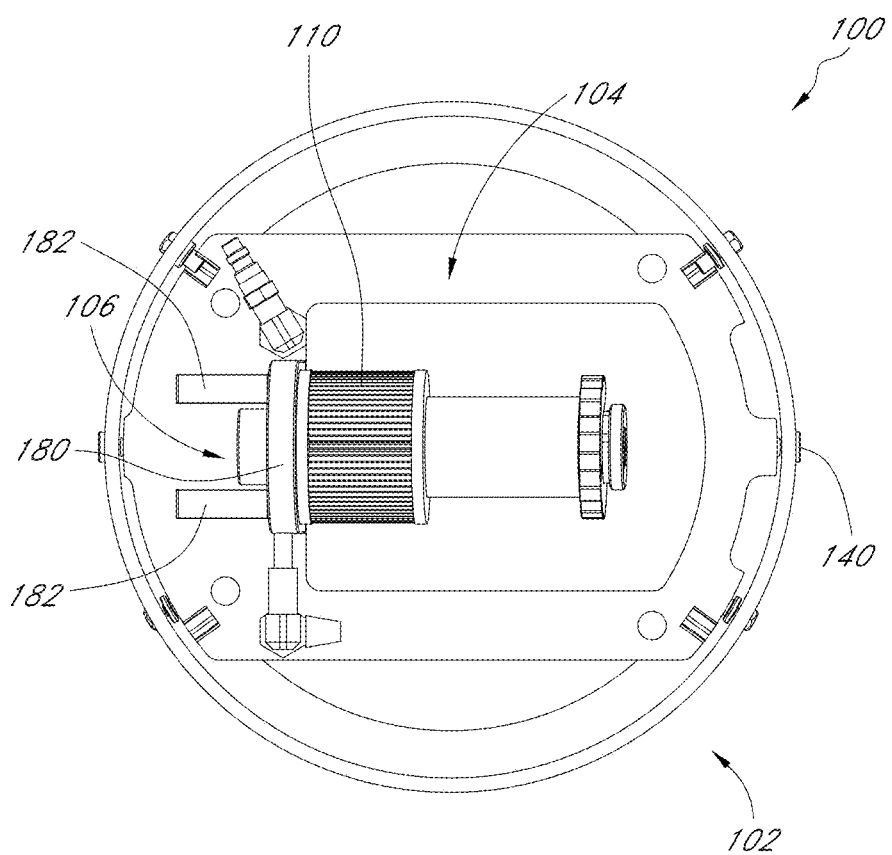
FIG. 14 is a top plan view of the cleaning assembly as shown in FIG. 9.
Figure 15:
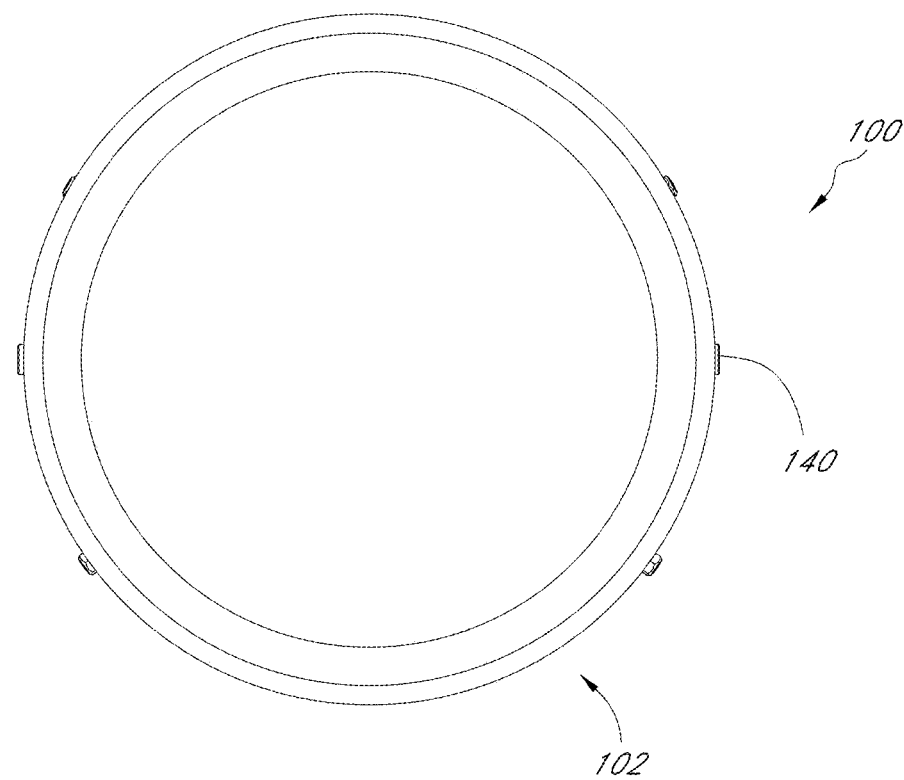
FIG. 15 is a bottom plan view of the cleaning assembly as shown in FIG. 9.

With reference to FIG. 8, the pressurizing spraying assembly 106 can be coupled to the mount 104. In the illustrated configuration, recesses (not shown) can be formed in the upper surface 164 of the mount 104. The recesses receive an upright 180 as well as two gussets 182. The recesses help to provide rigidity to the mounting arrangement. The upright 180 and the gussets 182 can be secured to the mount 104 in any suitable manner. In some configurations, the upright 180 and the gussets 182 are secured to each other and are secured to the recesses of the mount 104 using adhesives or the like. In some configurations, one or more of the gussets 182 and/or the upright 180 can be omitted. In some configurations, the mount 104 and the upright 180 and gussets 182 can be integrally formed. In some configurations, the mount 104 and one or more of the upright 180 and gussets 182 can be molded as a single piece. In some configurations, the upright 180 is inclined relative to a plane that is normal to a bottom of the housing 102. In some such configurations, the upright 180 is inclined by 1-6 degrees. In some such configurations, the upright 180 is inclined by 3 degrees. The incline helps to avoid direct splashing out of the bucket during use.

Figure 23:
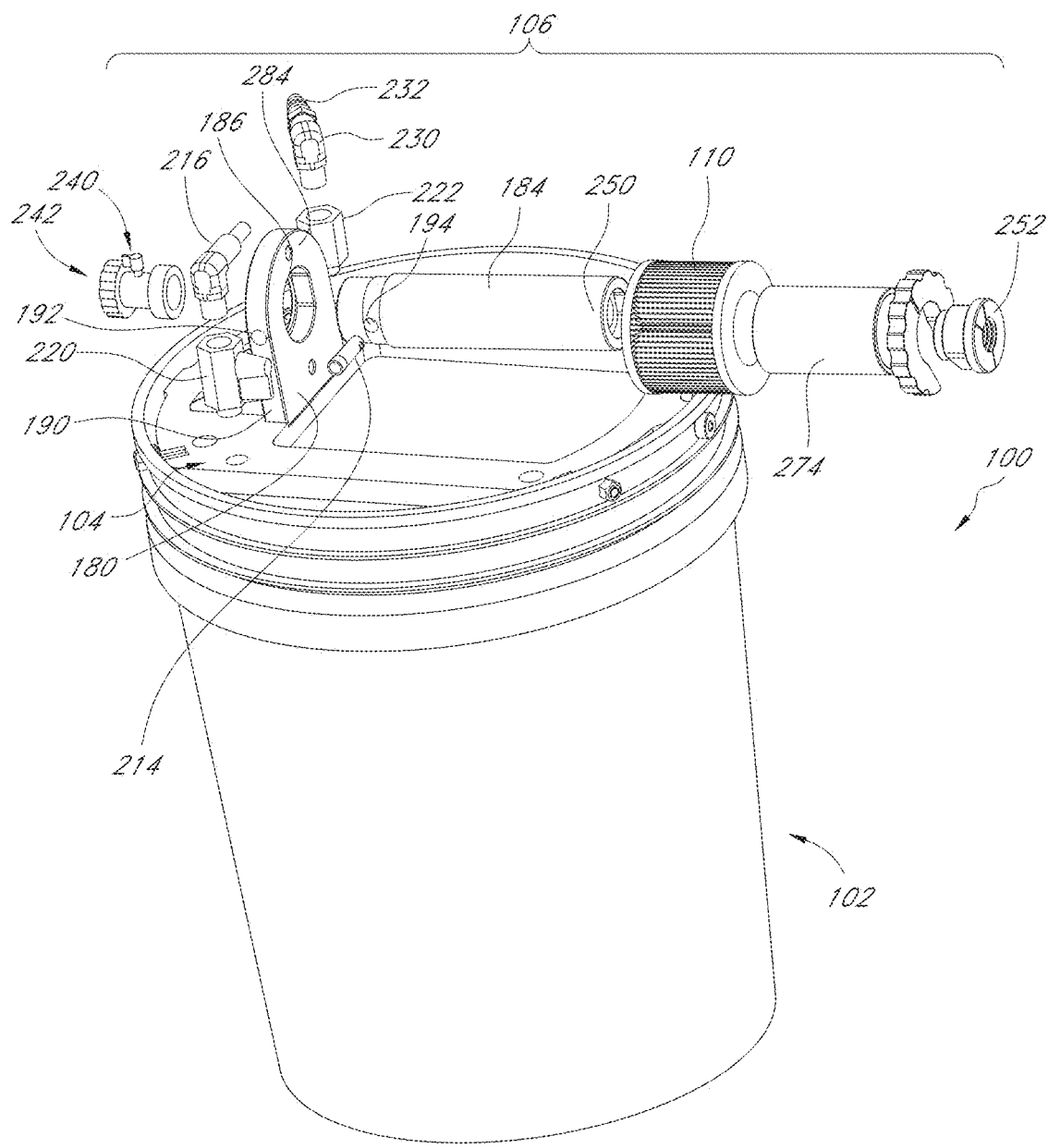
FIG. 23 is a top perspective exploded view of the cleaning assembly.

As shown in FIG. 23, a mixing chamber body 184 can be mounted to the upright 180. In some configurations, the mixing chamber body 184 extends through an opening 186 in the upright 180. In some such configurations, the mixing chamber body 184 can be secured in position relative to the upright using a suitable adhesive or the like.

Figure 24:
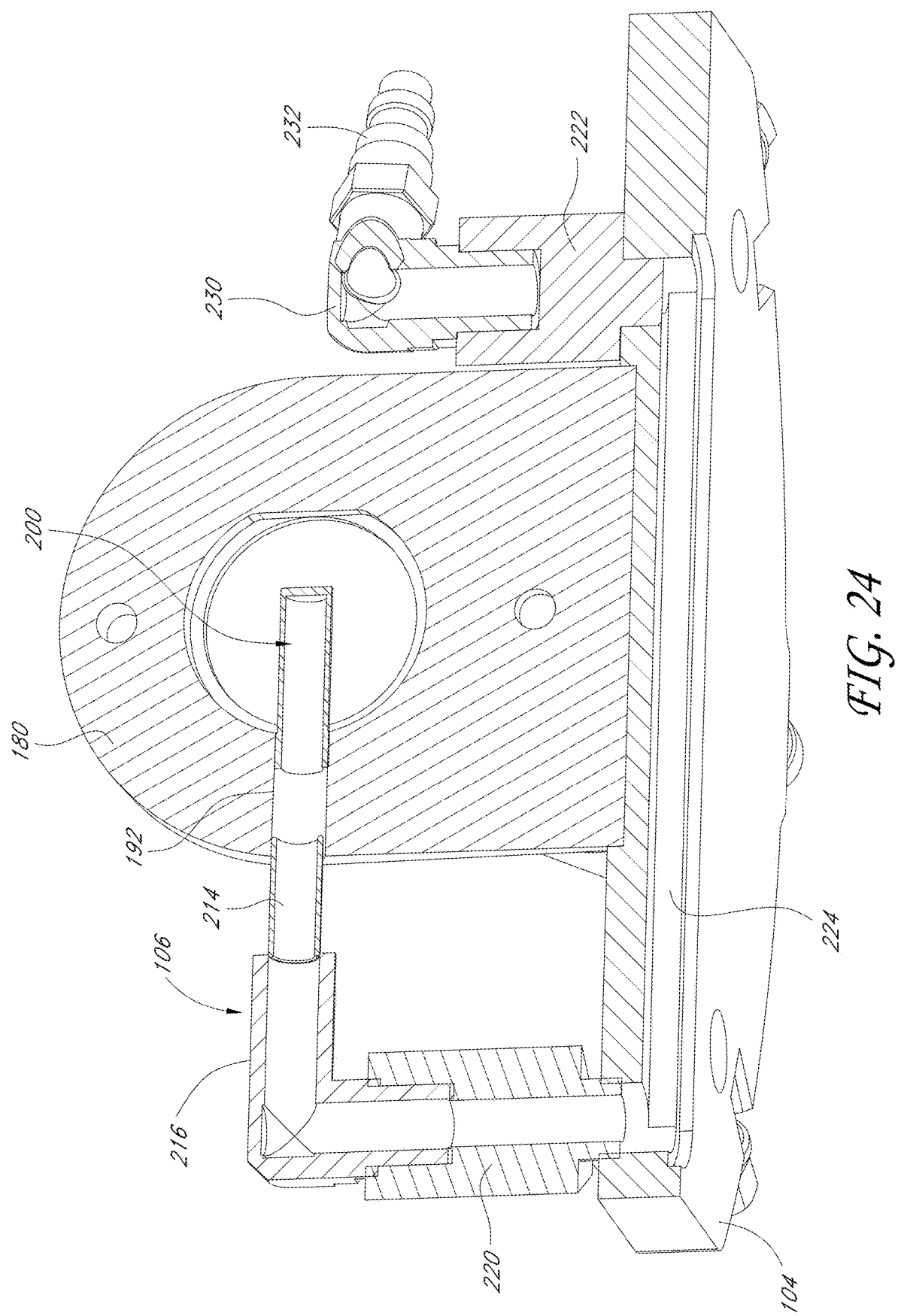
FIG. 24 is a vertical section through the mounting plate and the pressurizing spraying assembly showing an airflow path.
Figure 25:
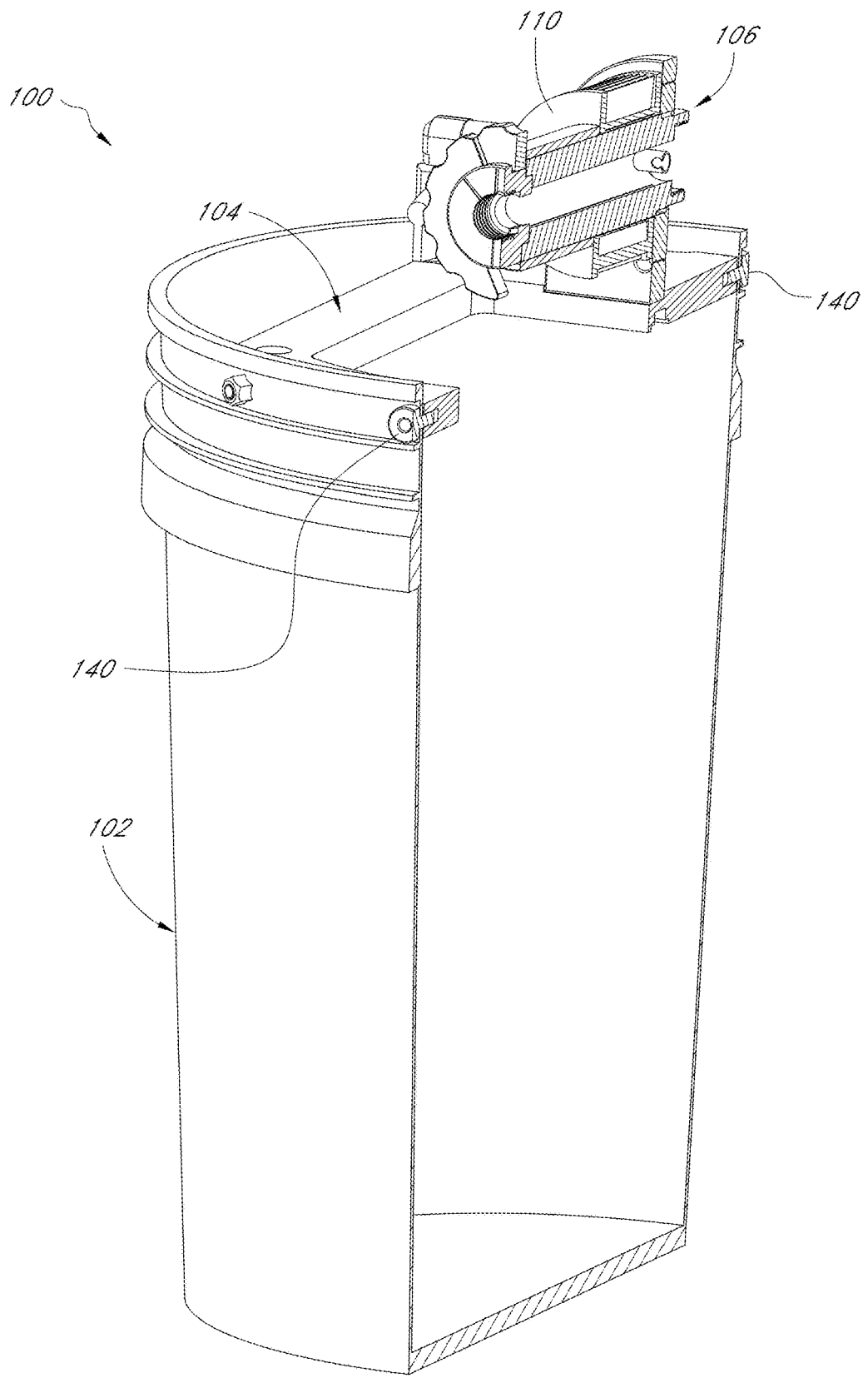
FIG. 25 is a vertical section through the cleaning assembly of FIG. 1 showing an air and water mixing chamber.
Figure 27:
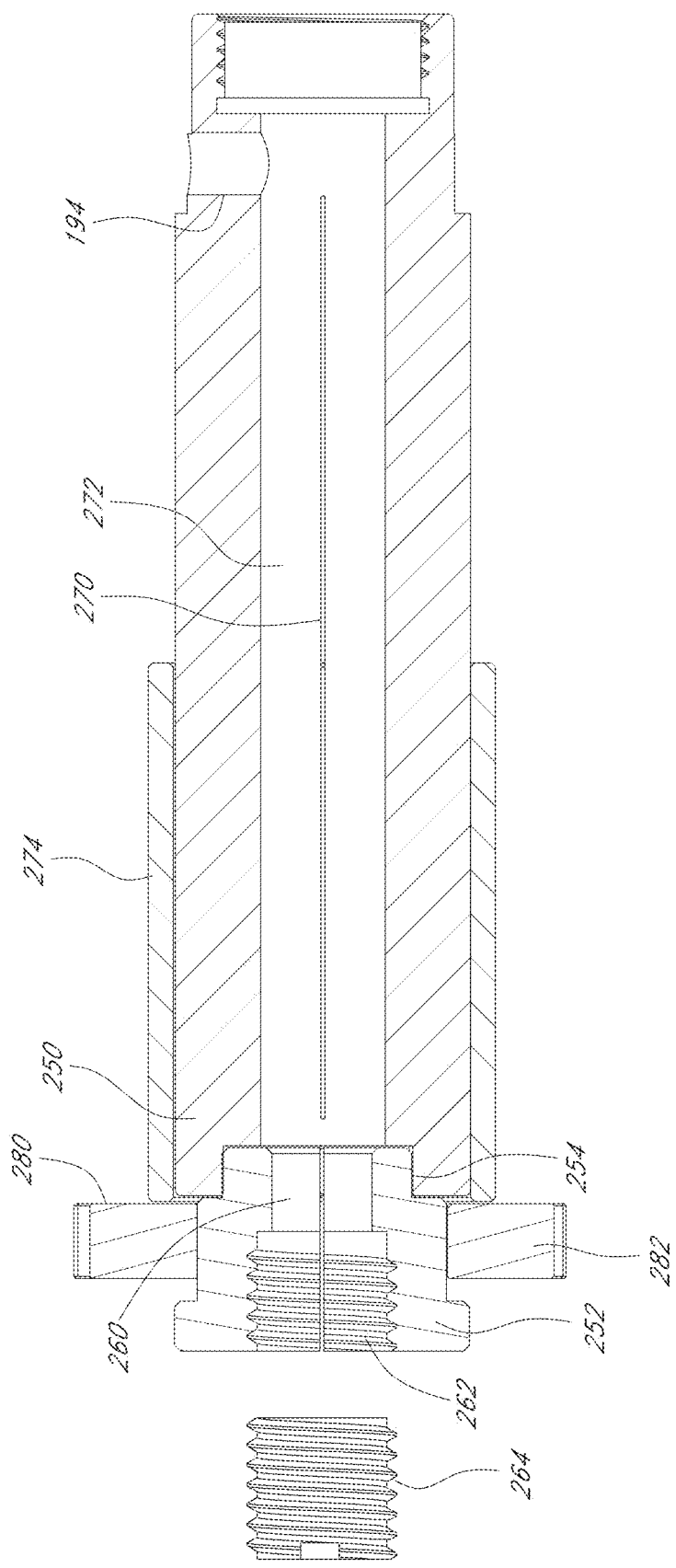
FIG. 27 is a horizontal section through the air and water mixing chamber showing an outlet of the pressurizing spraying assembly.
Figure 28:
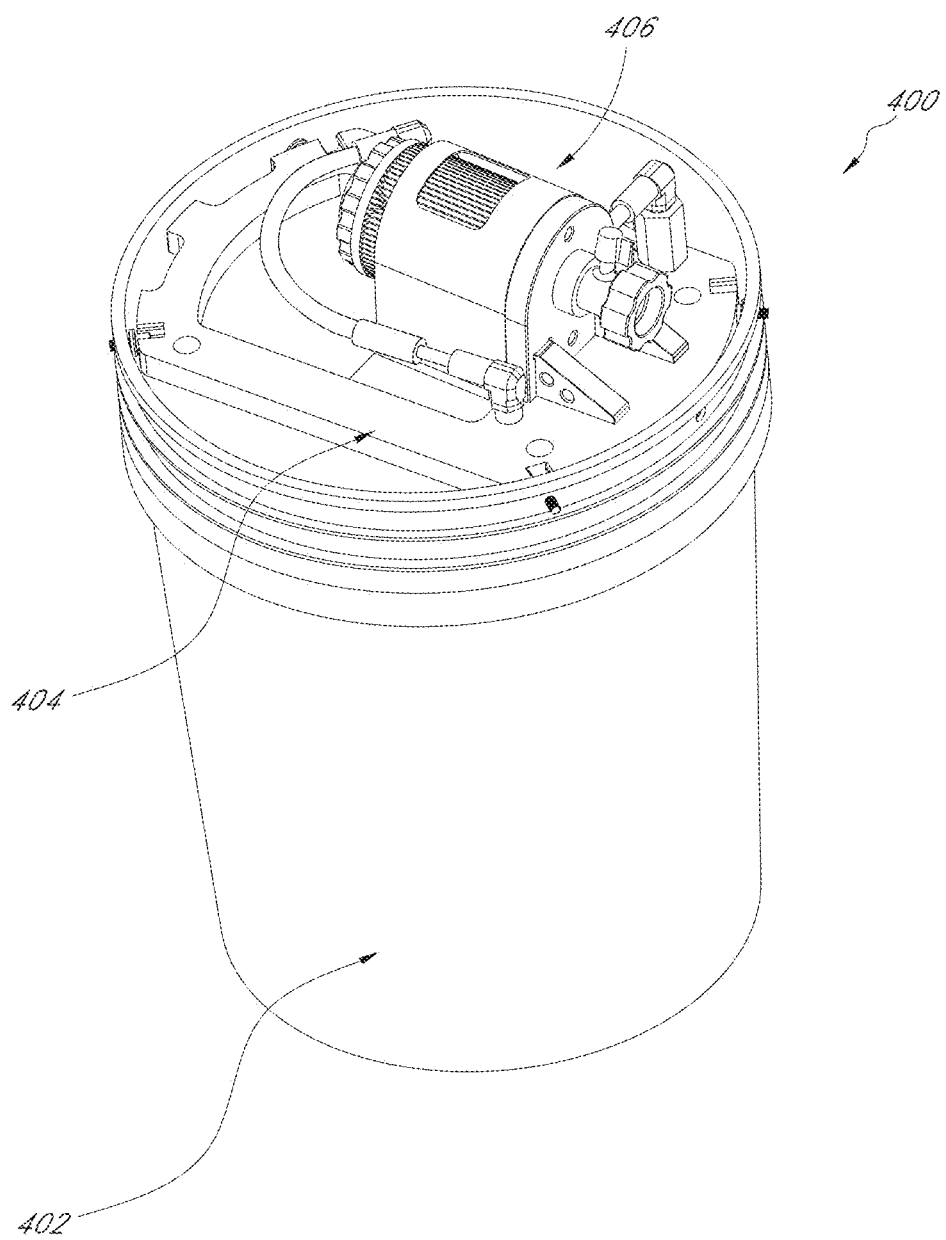
FIG. 28 is a top perspective view of another cleaning assembly with the handle removed and the mount and pressurizing spraying assembly pivoted to the use position.

With continued reference to FIG. 23, a sidewall 190 of the upright 180 comprises an opening 192. Similarly, the mixing chamber body 184 comprises an opening 194. When the mixing chamber body 184 is mounted to the upright 180, the opening 192 of the sidewall 190 of the upright 180 aligns with the opening 194 in the mixing chamber body 184. As shown in FIG. 24, an air nozzle 200 extends from the opening 192 of the sidewall 190 of the upright 180 and through the opening 194 of the mixing chamber body 184. As shown in FIG. 27, the air nozzle 200 extends into a lumen 202 defined by one or more wall 204 of the mixing chamber body 184.

Figure 26:
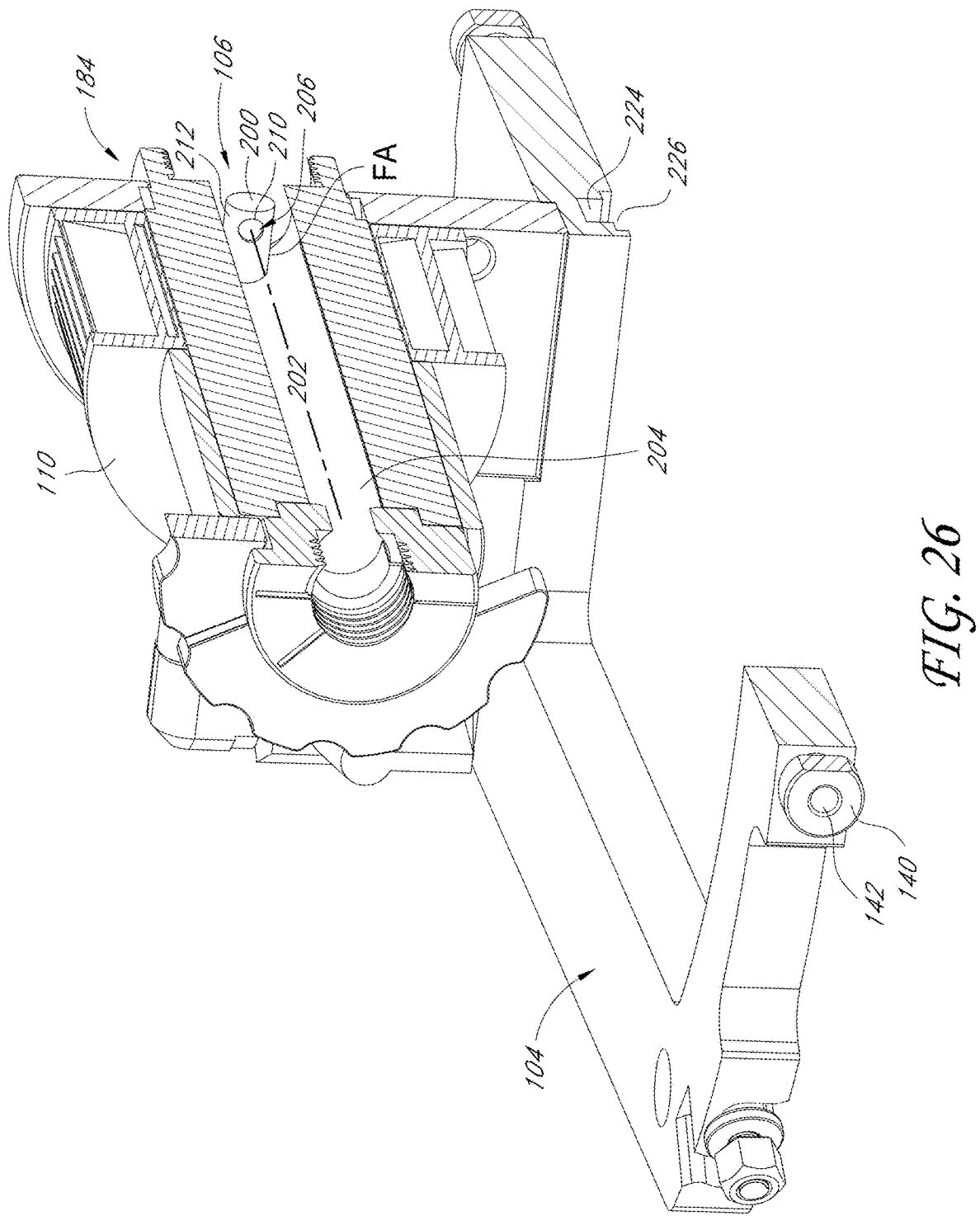
FIG. 26 is a vertical section through the air and water mixing chamber showing an air port leading into the air and water mixing chamber from the airflow path.

With reference to FIG. 26, the air nozzle 200 comprises an outlet port 206. In the illustrated configuration, the outlet port 206 comprises an opening 210 in a sidewall 212 of the air nozzle 200. Air passing through the opening 210 will be directed axially along the lumen 202 of the mixing chamber body 184. In the illustrated configuration, the outlet port 206 can be said to define a flow axis FA that extends along the axial direction of the lumen 202.

With reference again to FIG. 24, a tube 214 extends between the opening 192 in the sidewall 190 of the upright 180 and an elbow 216. The elbow 216 is fluidly coupled to an air valve 220. The air valve 220 is fluidly coupled to a check valve 222 through a gallery 224 formed in the mount 104. The gallery 224 is enclosed with a lid 226 as shown in FIG. 26. The check valve 222 reduces the likelihood of syphoning of water through the air supply system to the source of the air. Finally, an elbow 230 connects an air fitting 232 to the check valve 222. In some configurations (see FIG. 38), the check valve 460 can be positioned along an air supply line 462.

A hose (not shown) can connect to a pressurized air supply source. The hose (not shown) also can connect to the air fitting 232. In some configurations (see FIG. 38), the fitting 464 can be removably secured to the mount 404 when not in use such that the air supply line 462 can be constrained during movement between the use and storage positions. When pressurized air is supplied through the hose, the air will flow through the air fitting 232, through the elbow 230, through the check valve 222, through the gallery 224 and the air valve 220, through the elbow 216, through the tube 214, through the opening 192, through the air nozzle 200 and exit through the outlet port 206 into the mixing chamber body 184 in the axial direction defined by the lumen 202. Other configurations also can be used to couple the flow of pressurized gas with the lumen 202 of the mixing chamber body 184. Together, the inlet, which is the air fitting 232 in the illustrated configuration, to the outlet, which is the outlet port 206 in the illustrated configuration, define an air supply assembly 234.

With reference to FIG. 23, a water valve 240 and a hose coupling 242 are coupled to the mixing chamber body 184. The hose coupling 242 facilitates connection to a standard garden hose or the like. The water valve 240 allows control over the water supply directly at the cleaning assembly 100. The water valve 240 can be connected to the mixing chamber body 184 in any suitable manner. In some configurations, an adhesive or the like can be used to connect the water valve 240 to the mixing chamber body 184.

With reference to FIG. 23, a distal end 250 of the mixing chamber body 184 can receive a locking end cap 252. The locking end cap 252 can be secured in position relative to the mixing chamber body 184 in any suitable manner. In some configurations, such as that shown in FIG. 27, the locking end cap 252 can be secured within the distal end 250 of the mixing chamber body 250 by inserting a stepped portion 256 of the locking end cap 252 into a recess 254 formed in the distal end 250 of the mixing chamber body 250. The stepped portion 256 and the recess 254 can be secured using adhesives, threading or the like.

The illustrated locking end cap 252 comprises a through passage 260 that terminates in a threaded region 262. The threaded region 262 can receive a plug 264. With the plug in place, pressure can build within the mixing chamber body 184. With the plug 164 removed, it is possible to connect additional mixing chamber bodies or the like.

As shown in FIG. 27, a spraying outlet 270 extends through a wall 272 of the mixing chamber body 184. The spraying outlet 270 can be angularly offset from the opening 194. As reflected by the positioning of the opening 194, the spraying outlet 270 is angularly offset from the axis of the opening 194 by about 90 degrees in the illustrated configuration. The spraying outlet 270 can have any suitable configuration keeping in mind a desire to have an elongate outlet that can impinge a flow of pressurized water along an axial length of the filter element 110 being cleaned. In the illustrated configuration, the spraying outlet 270 is a slot. In the illustrated configuration, the slot has a length of between 2 inches and 10 inches. In some configurations, the slot can have a length of at least 4 inches. In some configurations, the slot need not have a length exceeding 9 inches. While the illustrated spraying outlet 270 is a slot, other configurations can be used, such as, but not limited to, a series of holes, whether in a line or a plurality of lines. In addition, the illustrated spraying outlet 270 is a slot having a width of 0.020 inch. The slot, however, could have a width of between 0.015 inch and 0.040 inch. In some configurations, the slot could have a width of at least 0.015 inch. In some configurations, the slot could have a width of no more than 0.060 inch. Furthermore, a single slot is illustrated. In some configurations, more than one slot could be used. Regardless of the configuration, the spraying outlet 270 must not be so large as to allow the pressure of the spray to drop to an undesirable level keeping in mind the mixing of the water and the pressurized air within the mixing chamber body 184.

With reference to FIG. 23, the illustrated filter element 110 is shorter than the length of the spraying outlet 270. Filter elements come in an assortment of axial lengths. To provide an arrangement that can be universal to the most common lengths of filter elements, the illustrated configuration includes one or more sleeve element 274. The sleeve element 274 has a diameter that fits closely over the outer diameter of the mixing chamber body 184. As shown in FIG. 27, an axial length of the sleeve element 274 is defined by the distance between an inner wall 280 of a retaining clip 282 and an inner wall 284 of the upright 180 less the axial length of the particular model of filter element 110 with which the sleeve element 274 was designed for use. In use, the sleeve element 274 blocks the portion of the spraying outlet 270 that extends beyond the axial length of the filter element 110.

Figure 36:
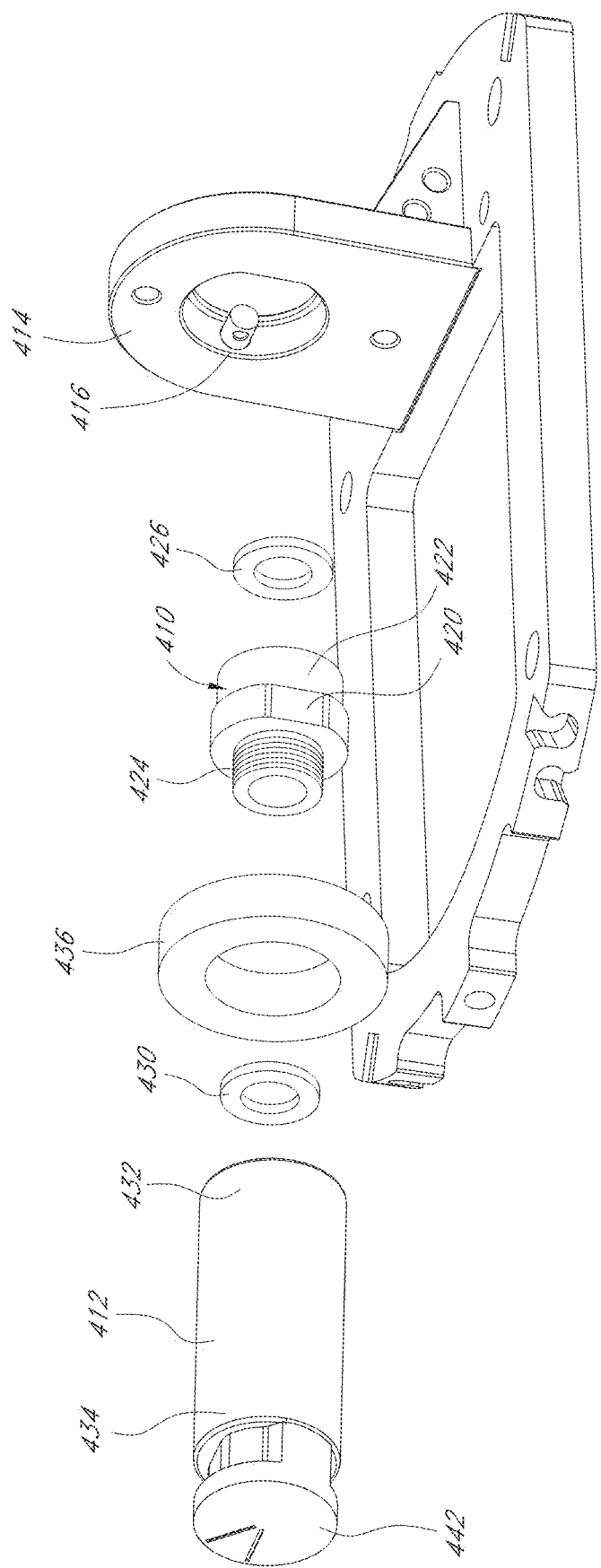
FIG. 36 is an exploded view of a portion of the pressurizing spraying assembly and mount of FIG. 29.
Figure 37:
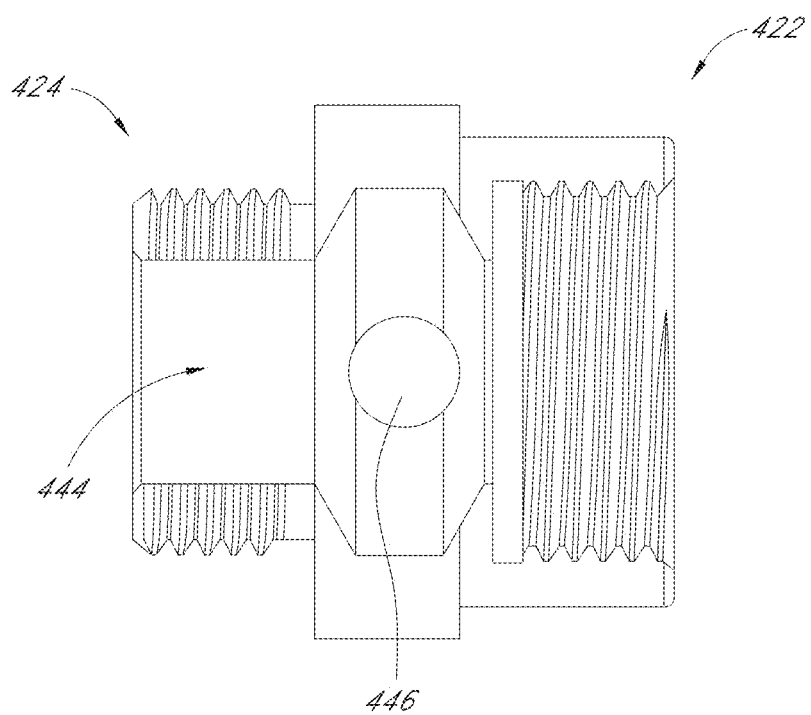
FIG. 37 is a sectioned view of a mandrel adapter.

With reference to FIG. 36, in some configurations, the mixing chamber body can be generally defined by a mandrel adapter 410 and a mandrel 412. The mandrel adapter 410 can be a component separate from an upright 414 or can be integrally formed with the upright. In the illustrated configuration, the mandrel adapter 410 can be inserted into an opening 416 formed within the upright 414 and secured in position. The mandrel adapter 410 can be welded, adhered, cohered or otherwise secured in position within the opening 416 of the upright 414. In some such configurations, the mandrel adapter 410 can be glued into position within the upright 414. In some configurations, the mandrel adapter 410 can be integrally formed with the upright. In some such configurations, the mandrel adapter 410 and the upright 414 can be injection molded or otherwise formed as a single component. In some configurations, an outer surface of the mandrel adapter 410 includes a flat surface 420. The flat surface 420 orients the mandrel adapter 410 in a desired rotational orientation relative to the upright 414.

The mandrel adapter 410 comprises a first axial end 422 and a second axial end 424. A flow passage 444 can be defined within the mandrel adapter 410. The flow passage 444 can extend between the first axial end 422 and the second axial end 424. The flow passage 444 can have a larger diameter at the first axial end 422 and a smaller diameter at the second axial end 424. In some such configurations, the flow passage 444 can expand between the first axial end 422 and the axial location 446 where the air supply extends inward into the flow passage from the upright 414. In some such configurations, the flow passage 444 can contract between the axial location 446 where the air supply extends inward into the flow passage from the upright and the second axial end 424.

The first axial end 422 is configured to receive a fluid washer 426 (e.g., rubber washer) and connects to a water valve (discussed below). The second axial end 424 comprises an outer threaded surface and is configured to receive the mandrel 412. A fluid washer 430 can be positioned between the mandrel adapter 410 and the mandrel 412.

The mandrel 412 can comprise a first axial end 432 and a second axial end 434. A base ring 436 can encircle the first axial end 432. The base ring 436 can space the filter away from the upright 414 when the filter is installed on the mandrel 412. In some configurations, the base ring 436 enables a single mandrel 412 to accommodate filter elements having different axial lengths. In some configurations, multiple base rings having different axial lengths can be used. In some configurations, the base ring 436 is omitted because different mandrels can be used to correlate to different axial lengths and/or inner diameters of filter elements.

Figure 34:
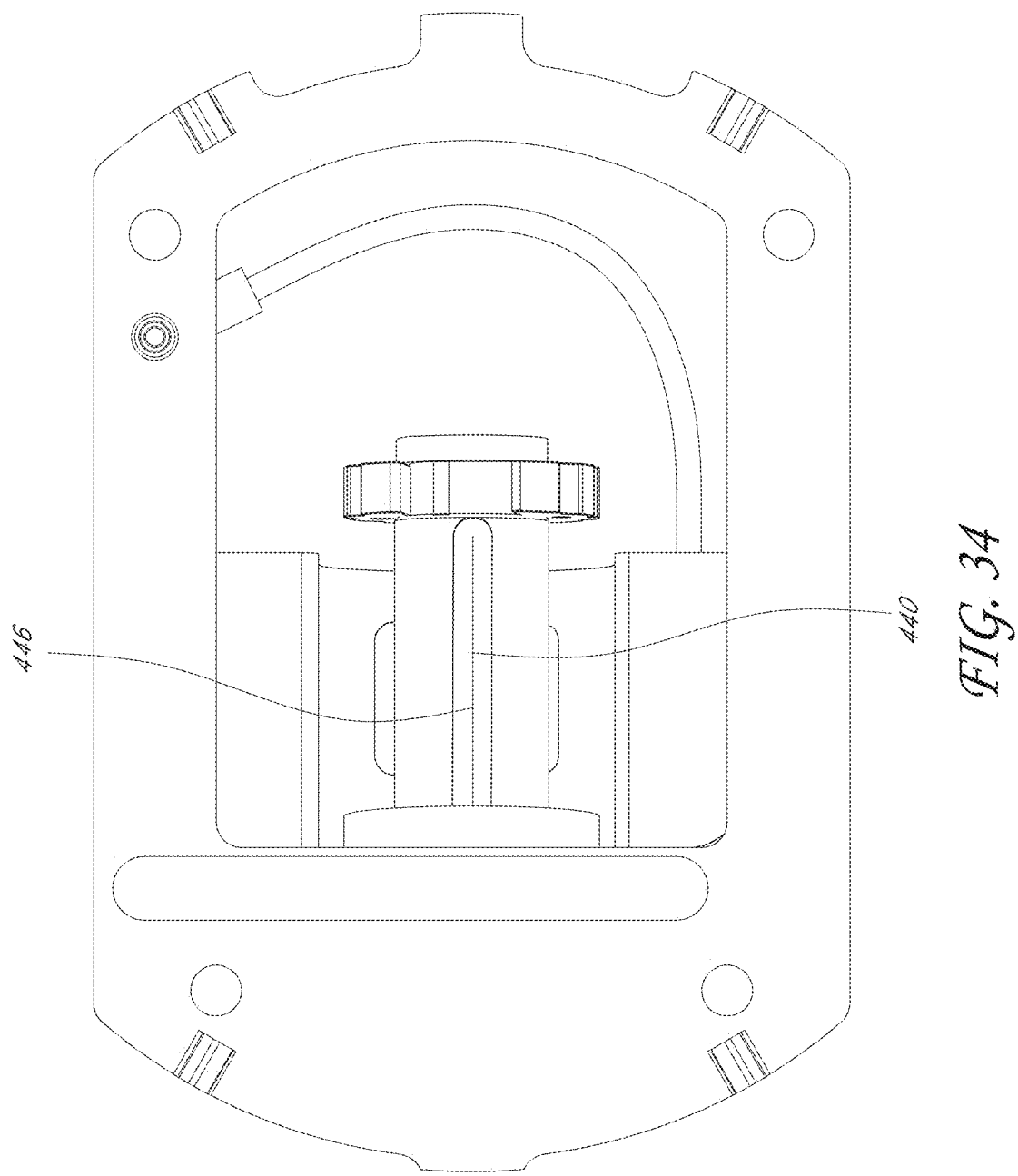
FIG. 34 is a bottom elevation view of the mount and pressurizing spraying assembly of FIG. 29.
Figure 35:
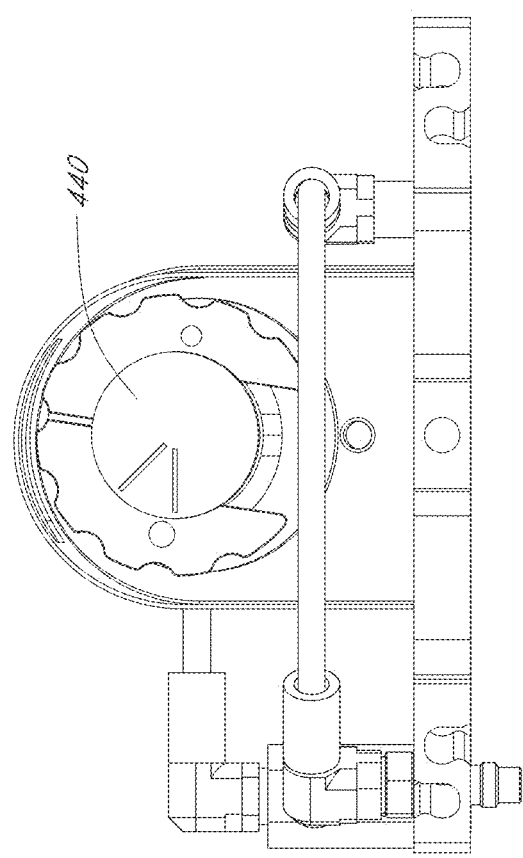
FIG. 35 is a front view of the mount and pressurizing spraying assembly of FIG. 29.

The first axial end 432 can comprise an internally threaded surface that mates with the externally threaded surface of the mandrel adapter 410. In the illustrated configuration, the threads of the mandrel 412 and the mandrel adapter 410 are configured and arranged such that when the mandrel 412 is fully threaded onto the mandrel adapter 410, the mandrel 412 is oriented with the a spraying outlet 440 direct downwardly (see FIG. 34).

Figure 39:
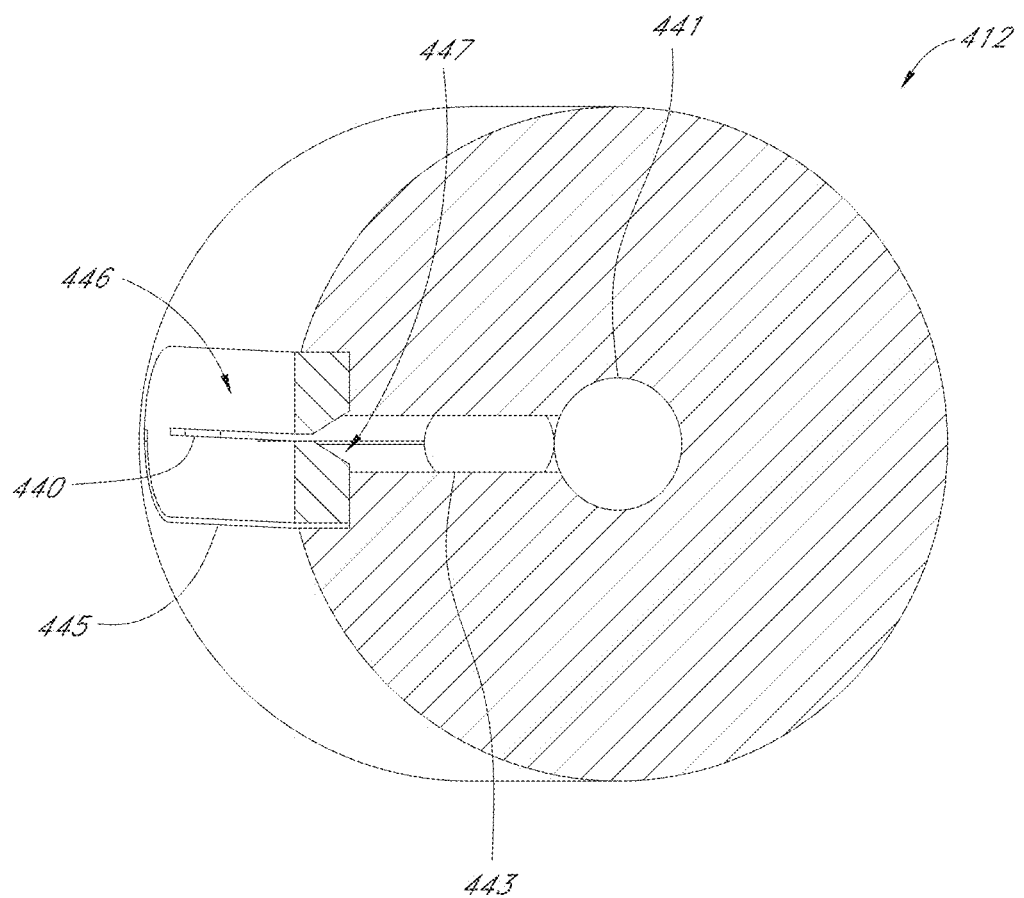
FIG. 39 is a cross section view of a mandrel.

The second axial end 434 receives a locking end cap 442. The locking end cap 442 can include indicia that indicates that the mandrel 412 has been fully threaded onto the mandrel adapter 410. The illustrated configuration advantageously facilitates that use of mandrels of different lengths such that the mandrels can be configured for specific filter sizes. In other words, the lengths of the filter elements of different filters vary; the mandrels can be sized and configured With reference to FIG. 34 and FIG. 39, the spraying outlet 440 of the mandrel 412 is defined by a slot 447. A passage 441 extends from the first axial end 432. The illustrated passage 441 extends from the first axial end 432 to the second axial end 434. The passage 441 can have a smaller diameter than the flow passage 444 at the second axial end 424 of the mandrel adapter 410. In the illustrated configuration, the passage 441 extends axially within the mandrel 412. The passage 441 is connected to the slot 447 with a channel 443. The channel 443 extends along a portion of the passage 441 and intersects a portion of the passage 441. The channel 443 preferably intersects only a portion of the passage 441. The illustrated channel 443 extends radially between the passage 441 and the slot 447.

The slot 447 can be configured as described above. In some configurations, the slot 447 can be defined by an insert 446. The mandrel 412 can comprise a recess or an opening 445 that receives the insert 446. The insert 446 and the mandrel 412 can be formed of compatible materials. In some configurations, the insert 446 is formed of a different material than the mandrel 412. In some configurations, the insert 446 can be adhered, cohered, or welded into position on the mandrel 412. In some such configurations, the insert 446 is glued into the mandrel 412. The insert 446 facilitates machining of the slot 447 that defines the spraying outlet 440. The slot 447 can have any suitable configuration. The illustrated slot 447 can taper such that it has a larger cross-section at the inlet and a smaller cross-section at the outlet. In the illustrated configuration, the slot 447 is V-shaped in cross-section. Other configurations also can be used. The slot can have any suitable dimensions that will facilitate adequate spray velocity/pressure along with sufficient coverage of the filter element to provide adequate flushing of the filter element. In some configurations, the outlet of the slot has a width of about 13 to 15 thousands of an inch.

Figure 38:
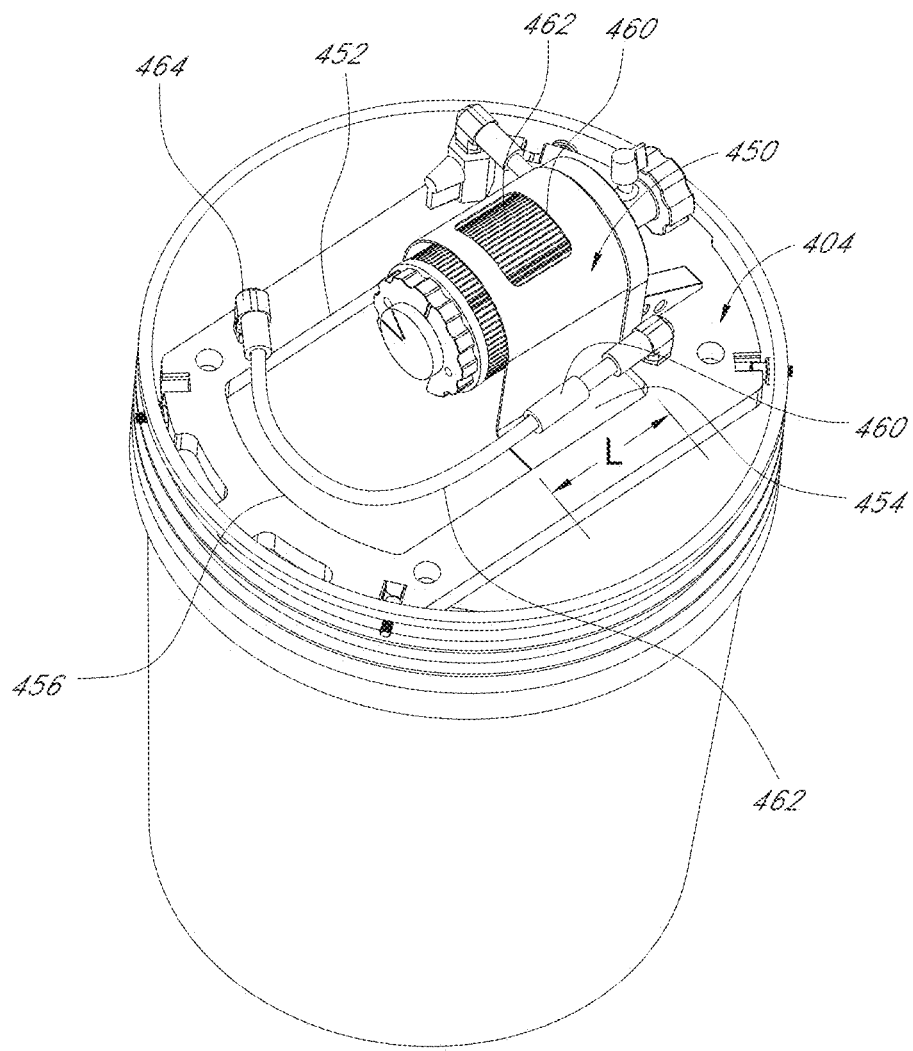
FIG. 38 is a top perspective view of the cleaning assembly of FIG. 29 with a filter element in position for cleaning.

With reference to FIG. 38, at least a portion of the pressurizing spraying assembly 406 can be covered by a shield 450. The shield 450 has a length L in the axial direction of the mandrel 412. The length L can shorter than a length of a filter element received on the mandrel 412 for cleaning. The shield 450 can be sized to be universal relative to all possible mandrels 412 but preferably is removable from the mount 404. In the illustrated configuration, the mount 404 can comprise grooves 452 that receives flanges 454 of the shield 450. The grooves 452 can be formed in the sidewalls of the opening 456. The flanges 454 can slide within the grooves 452, which terminate short of a full length of the sidewalls of the opening 456 in the illustrated configuration. The grooves can slope at the same angle as the angle of the mandrel 412 as a result of the angle of the upright 414.

The illustrated shield 450 includes a window 460. The window 460 provides access to a filter element 462 during a cleaning operation. In the illustrated configuration, the window 460 enables an operator to see the cleaning of the filter element 462 while also providing the operator with the ability to turn the filter element 462 relative to the mandrel 412. In some configurations, the shorter length of the shield enables turning of the filter element 462 and helps with removal of the filter element 462 following a cleaning operation. In some configurations, the shield may be at least partially transparent and the filter element 462 can be turned at the second end of the mandrel such that the window can be omitted.

Figure 19:
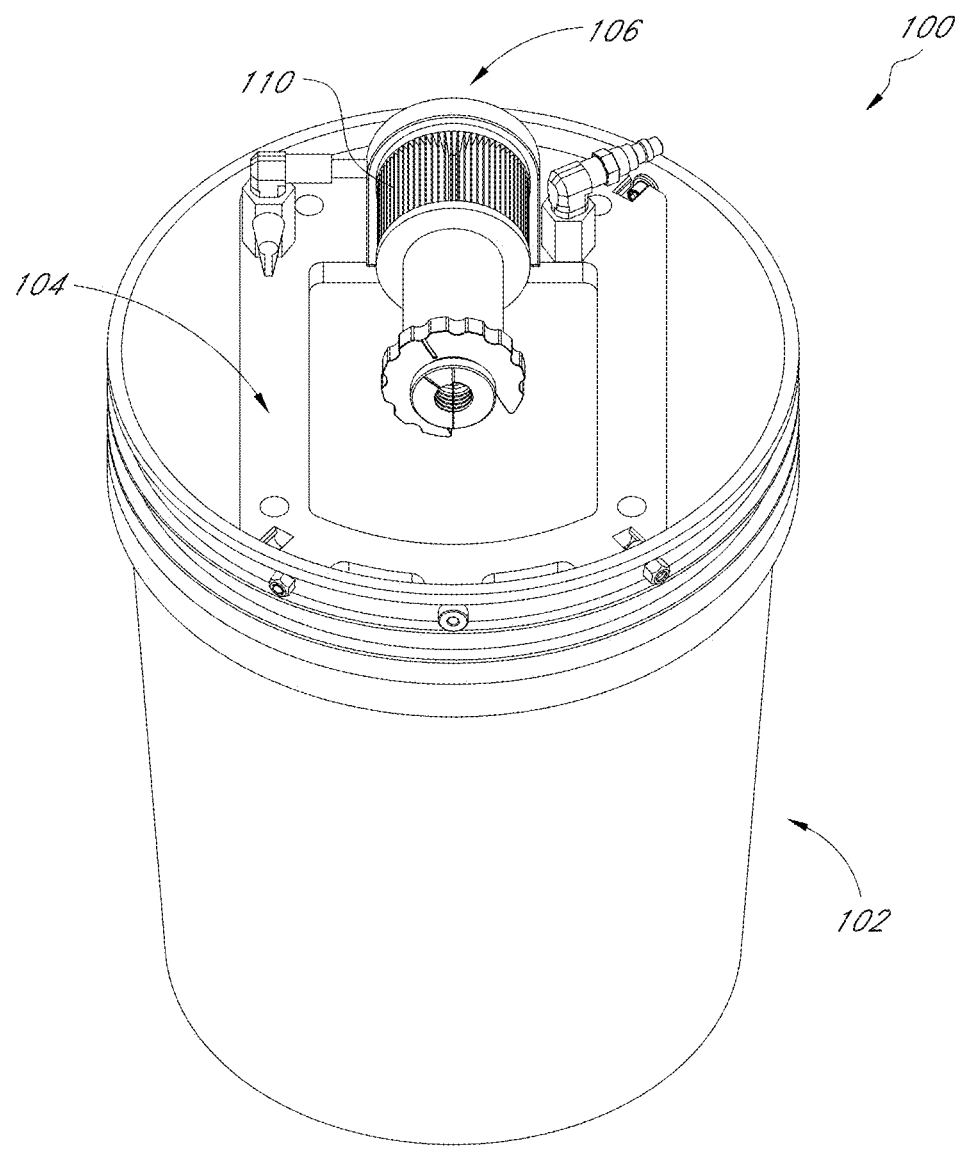
FIG. 19 is a top perspective view of the cleaning assembly of FIG. 1 with the handle removed and showing an unlocked position of a retaining clip.
Figure 20:
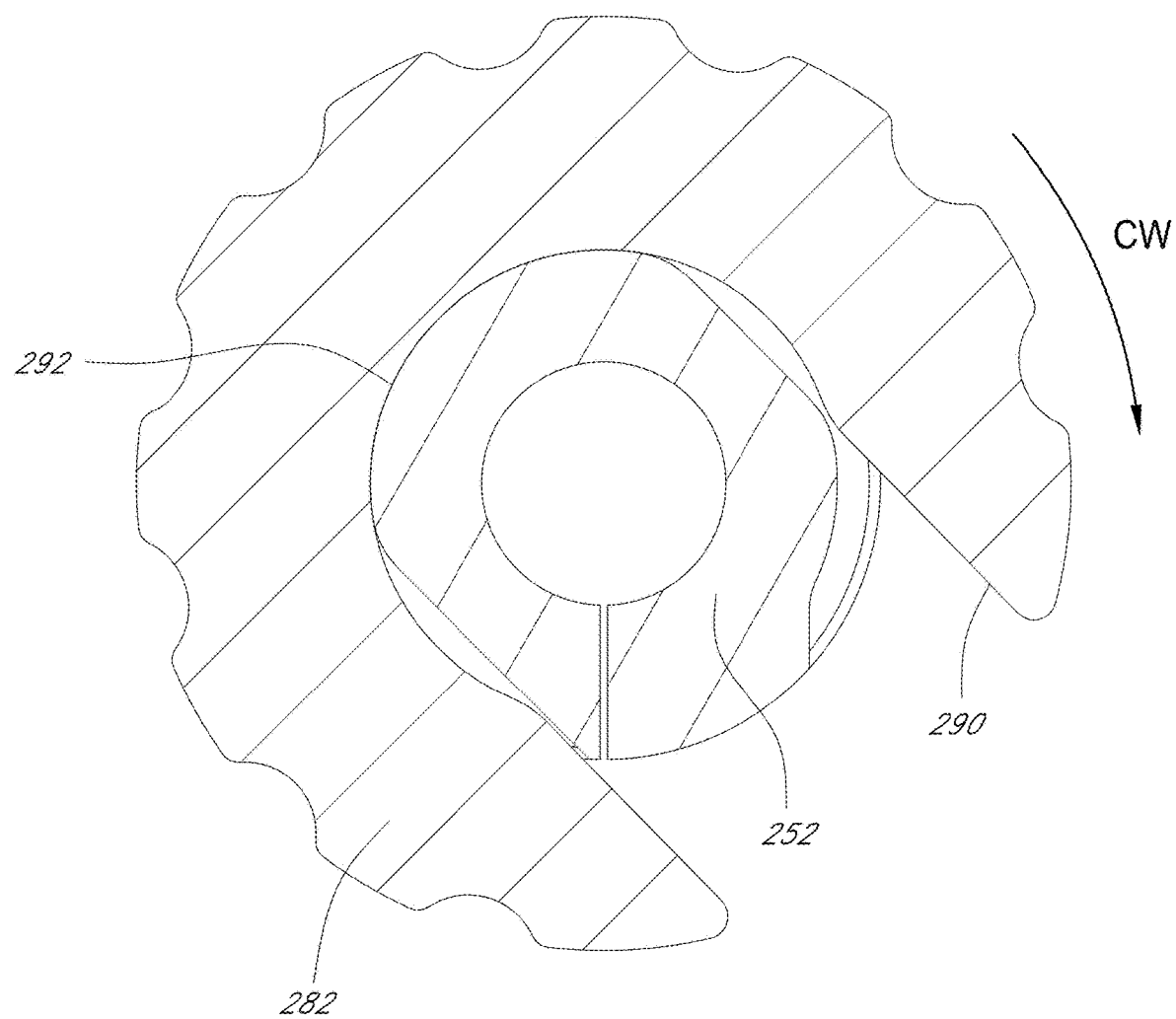
FIG. 20 is a sectioned view through the retaining clip showing the retaining clip in the unlocked position.
Figure 21:
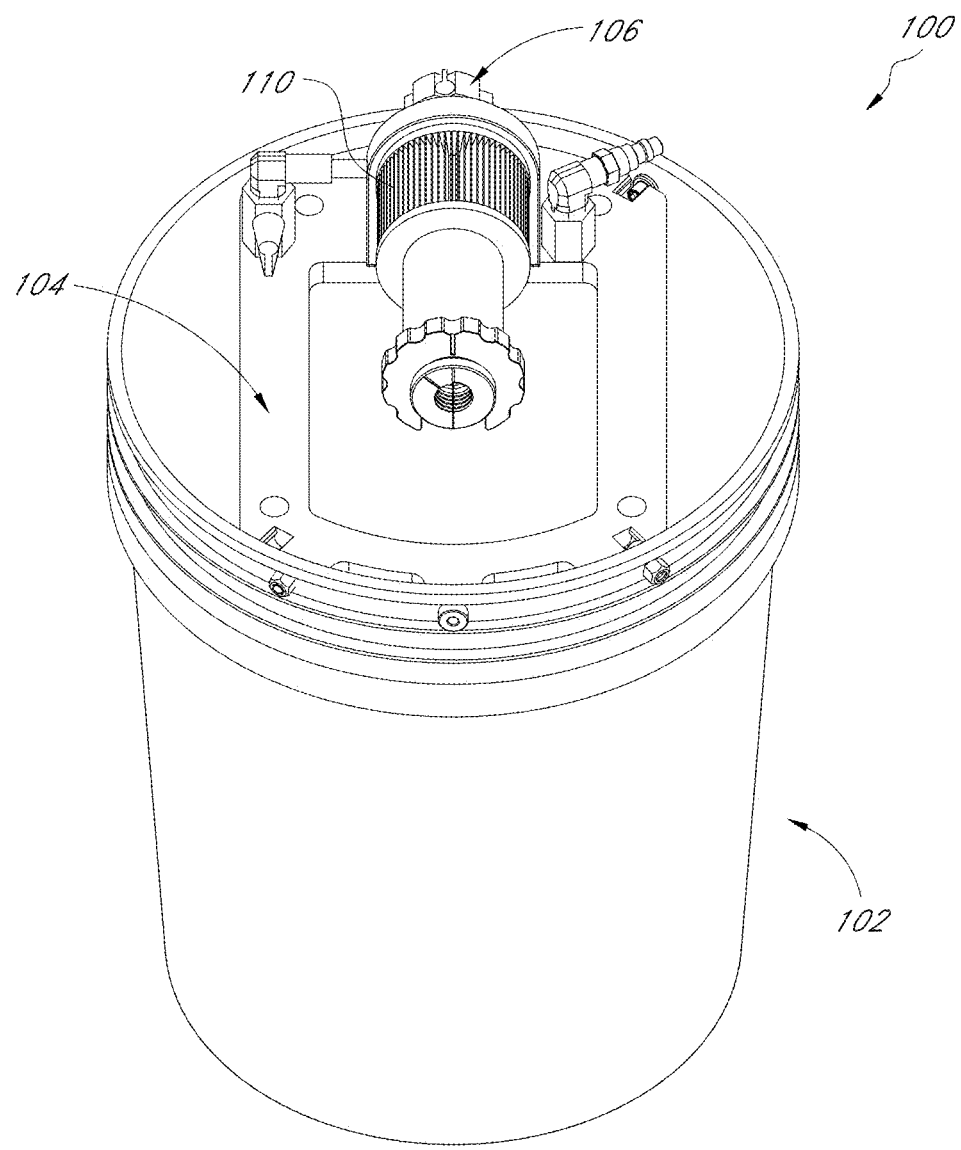
FIG. 21 is a top perspective view of the cleaning assembly of FIG. 1 with the handle removed and showing a locked position of the retaining clip.
Figure 22:
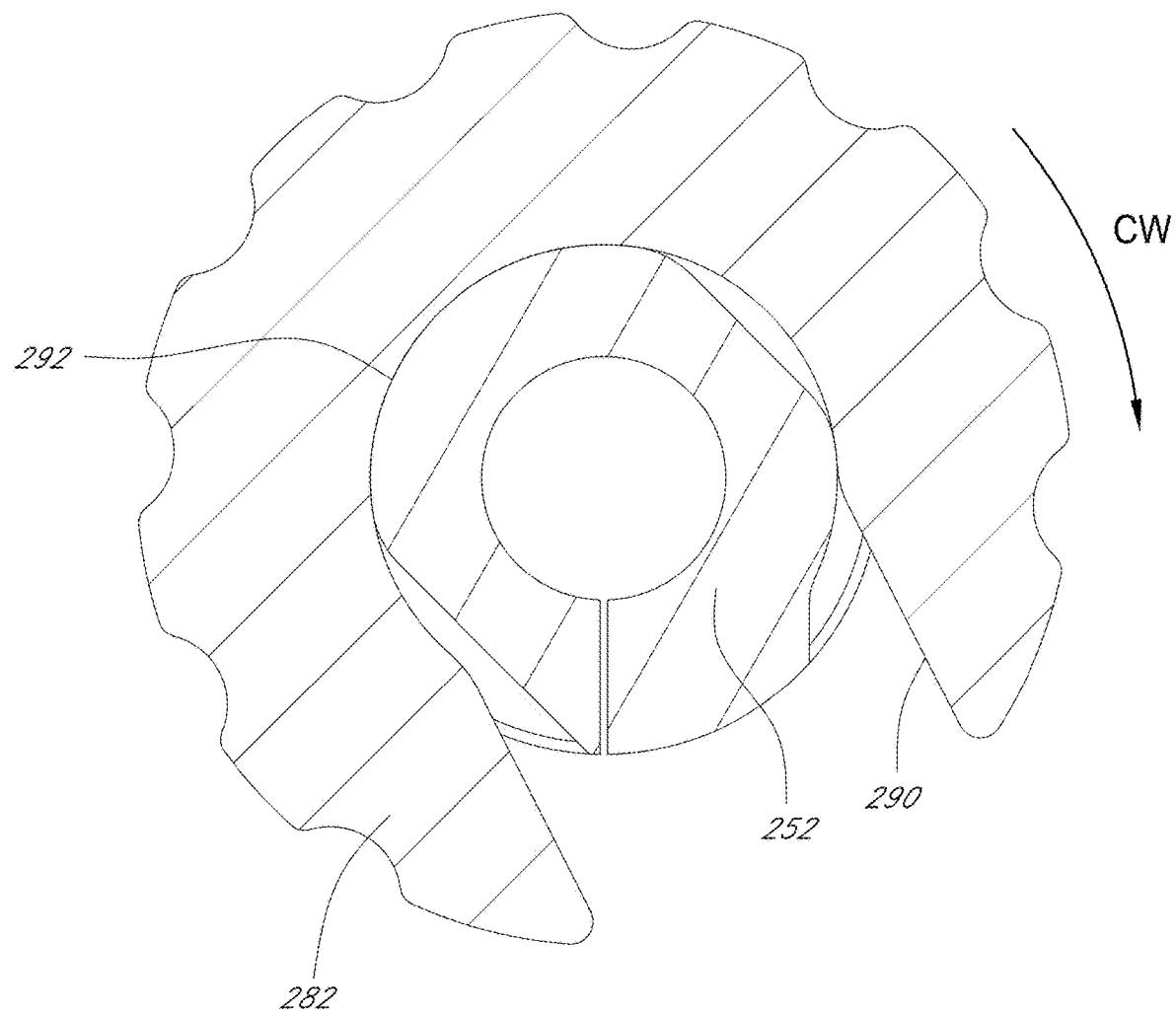
FIG. 22 is a sectioned view through the retaining clip showing the retaining clip in the locked position.

The retaining clip 282 secures the filter element 110 and the sleeve element 274 in position on the outer surface of the mixing chamber body 184. The retaining clip 282 and the locking end cap 252 can have interlocking shapes. With reference to FIGS. 19-22, the interaction of the retaining clip 282 and the locking end cap 252 will be described. As shown in FIGS. 19-20, the retaining clip 282 has a mouth 290 that has a span sufficient to pass over a narrowed region of the locking end cap 252. Thus, the retaining clip 282 can be slid onto the locking end cap 252 in a generally radial direction until a bight of the retaining clip 282 contacts the locking end cap 252. At this stage, the retaining clip 282 can be rotated into the position shown in FIGS. 21-22. In the illustrated configuration, this results in the retaining clip 282 contacting a camming surface of the locking end cap 252 such that one or more of audible indicator, a tactile indicator, a haptic indicator, and a visual indicator would be provided to confirm that the retaining clip 282 is in the locked position. A visual indicator of the one or both of the locked and/or unlocked positions can be provided, as shown in FIG. 19.

Other than the air supply assembly described above and the sleeve element, most of the assembly is formed from gluable PVC. PVC can be readily connected with adhesives and the material is non-corrosive, which provides a long life span for the cleaning assembly. In some configurations, one or more of the components can be molded to decrease parts and to reduce or eliminate potential leakage locations.

In use, the lid 262 is removed and the mount 104 with the pressurizing spraying assembly 106 is rotated from the storage position into the use position. In some configurations, the mount 104 will snap into position relative to the housing 102. The filter element 110 is slid onto the outer surface of the mixing chamber body 184. If needed, the appropriate sleeve element 274 is slid onto the outer surface of the mixing chamber body 184 until it abuts the filter element 110. The retaining clip 282 is moved radially onto the locking end cap 282 and is rotated into the locked position. In some configurations, the retaining clip 282 may snap into the locked position.

The water supply and the pressurized air supply can be fitted to the cleaning assembly 100 either before or after the filter element 110 and the sleeve element 274 are mounted. The air supply and the water supply can be turned on in either order. If desired, a detergent can be provided to the filter element 110 and the filter element 110 can be rotated while the pressurized water spray from the spraying outlet 270 impinges the inner wall of the filter element 110, thereby cleaning the filter element. The water emerging from the filter element 110, together with any debris from the filter element, collects in the base of the housing 102.

Once the filter element 110 is sufficiently clean, the sleeve element 274 (where used), the filter element 110, the water supply and the air supply can be removed from the cleaning assembly 100. The water and debris can be safely disposed in an environmentally friendly manner. In some situations, the housing 102 can be tipped about the handle 130 and the contents can be emptied into another vessel. The filter element 110 can be dried and reassembled according to manufacturer directions. The housing 102 can be dried or left to air dry and then the mount 104 can be returned to the storage position and the lid 126 can be attached prior to storing the cleaning assembly until the next use.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A cleaning assembly usable to clean a filter element of a reusable filter comprises a housing, a mount movably coupled to the housing, and a pressurizing spraying assembly coupled to the mount, the housing comprising a five-gallon bucket, the five-gallon bucket comprising a base, a sidewall extending upward to a upper rim from the base, and a lid removably attachable to the upper rim of the five-gallon bucket, a handle attached to an upper end of the sidewall, the handle rotatable about a pivot axis, pivot pins extending through the sidewall at the pivot axis, the mount being movably coupled to the housing with the pivot pins, a first set of rollers extending inwardly from the upper end of the sidewall and a second set of rollers extending inwardly from the upper end of the sidewall, the first set of rollers being positioned to a first lateral side of the pivot axis by a first distance and the second set of rollers being positioned to a second lateral side of the pivot axis by a second distance, the first distance being greater than the second distance, the mount comprising a first set of cambered slots and a second set of cambered slots, the first set of cambered slots configured to receive the first set of rollers and the second set of cambered slots being configured to receive the second set of rollers, the first set of cambered slots being formed on a first surface of the mount and the second set of cambered slots being formed on a second surface that is opposite of the first surface of the mount, and the first set of cambered slots being laterally outward of the second set of cambered slots.

2. The cleaning assembly of claim 1, wherein a pressurizing spraying assembly is positioned on the mount.

3. The cleaning assembly of claim 2, wherein a shield is positioned to cover at least a portion of the pressurizing spraying assembly.

4. The cleaning assembly of claim 2, wherein the pressurizing spraying assembly comprises a mixing chamber body that is configured to receive pressurized air and water.

5. The cleaning assembly of claim 4, wherein the mixing chamber body comprises a mandrel adapter and a mandrel that is removable from the mandrel adapter.

6. The cleaning assembly of claim 4, wherein the mixing chamber body comprises an axially extending slotted outlet.

* * * * *